(12) United States Patent
Swanson et al.

(10) Patent No.: US 11,676,256 B2
(45) Date of Patent: Jun. 13, 2023

(54) ABSOLUTE GEOSPATIAL ACCURACY MODEL FOR REMOTE SENSING WITHOUT SURVEYED CONTROL POINTS

(71) Applicant: Maxar Intelligence Inc., Westminster, CO (US)

(72) Inventors: Nathan Swanson, Erie, CO (US); Steven F. Hartung, Boulder, CO (US); Wolfgang Schickler, Golden, CO (US); Laurence C. Bleiler, Denver, CO (US)

(73) Assignee: Maxar Intelligence Inc., Westminster, CO (US)

( * ) Notice: Subject to any disclaimer, the term of this patent is extended or adjusted under 35 U.S.C. 154(b) by 89 days.

(21) Appl. No.: 17/351,659

(22) Filed: Jun. 18, 2021

(65) Prior Publication Data
US 2022/0405906 A1    Dec. 22, 2022

(51) Int. Cl.
*G06T 7/00* (2017.01)
*G06V 20/13* (2022.01)
*G06F 18/22* (2023.01)

(52) U.S. Cl.
CPC .......... *G06T 7/0002* (2013.01); *G06F 18/22* (2023.01); *G06V 20/13* (2022.01); *G06T 2207/10032* (2013.01); *G06T 2207/30181* (2013.01)

(58) Field of Classification Search
CPC ........ G06T 7/0002; G06T 2207/10032; G06T 2207/30181; G06K 9/6201; G06V 20/13
See application file for complete search history.

(56) References Cited

U.S. PATENT DOCUMENTS 8,121,433 B2   2/2012 Leprince et al.
8,958,980 B2   2/2015 Miksa et al.
(Continued)

FOREIGN PATENT DOCUMENTS

EP   2132530 B1   8/2013
EP   3800440 A1   4/2021

OTHER PUBLICATIONS

Jiao, Niangang, et al., "A generic framework for improving the geopositioning accuracy of multi-source optical and SAR imagery," ISPRS Journal of Photogrammetry and Remote Sensing, vol. 169, Oct. 2020, 12 pages.
(Continued)

*Primary Examiner* — Ming Y Hon
(74) *Attorney, Agent, or Firm* — Vierra Magen Marcus LLP

(57) ABSTRACT

Estimating absolute geospatial accuracy in input images without the use of surveyed control points is disclosed. For example, the absolute geospatial accuracy of a satellite images may be estimated without the use of control points (GCPs). The absolute geospatial accuracy of the input images may be estimated based on a statistical measure of relative accuracies between pairs of overlapping images. The estimation of the absolute geospatial accuracy may include determining a root mean square error of the relative accuracies between pairs of overlapping images. For example, the absolute geospatial accuracy of the input images may be estimated by determining a root mean square error of the shears of respective pairs of overlapping images. The estimated absolute geospatial accuracy may be used to curate GCPs, evaluate a digital elevation map, generate a heatmap, or determine whether the adjust the images until a target absolute geospatial accuracy is met.

20 Claims, 15 Drawing Sheets
(2 of 15 Drawing Sheet(s) Filed in Color)

(56) References Cited

U.S. PATENT DOCUMENTS

| | | | |
|---|---|---|---|
| 9,251,419 B2 | 2/2016 | Johnston et al. | |
| 9,269,145 B2 | 2/2016 | Ely et al. | |
| 9,875,404 B2 | 1/2018 | Johnston et al. | |
| 10,339,663 B2 | 7/2019 | Hernandez et al. | |
| 10,565,787 B1* | 2/2020 | Jordan | G06T 17/05 |
| 2005/0031197 A1* | 2/2005 | Knopp | G01C 11/06 |
| | | | 382/154 |
| 2009/0089018 A1* | 4/2009 | Kelley | G06T 17/05 |
| | | | 703/1 |
| 2017/0250751 A1* | 8/2017 | Kargieman | G06V 10/30 |
| 2019/0102624 A1* | 4/2019 | Sasaki | G01C 11/06 |
| 2020/0327696 A1* | 10/2020 | Habib | G01S 17/89 |
| 2021/0065386 A1* | 3/2021 | Boroughs | G06T 7/13 |
| 2021/0124975 A1* | 4/2021 | Nilosek | G06T 5/50 |
| 2021/0134055 A1* | 5/2021 | Verret | G06T 5/007 |

OTHER PUBLICATIONS

Tang, Shengjun, et al., "Combined adjustment of multi-resolution satellite imagery for improved geo-positioning accuracy," ISPRS Journal of Photogrammetry and Remote Sensing, vol. 114, Feb. 2016, # pages.

Chen, Xiaowei, et al., "SRTM DEM-Aided Mapping Satellite-1 Image Geopositioning Without Ground Control Points," IEEE Geoscience and Remote Sensing Letters, vol. 14, No. 11, Nov. 2017, 5 pages.

* cited by examiner

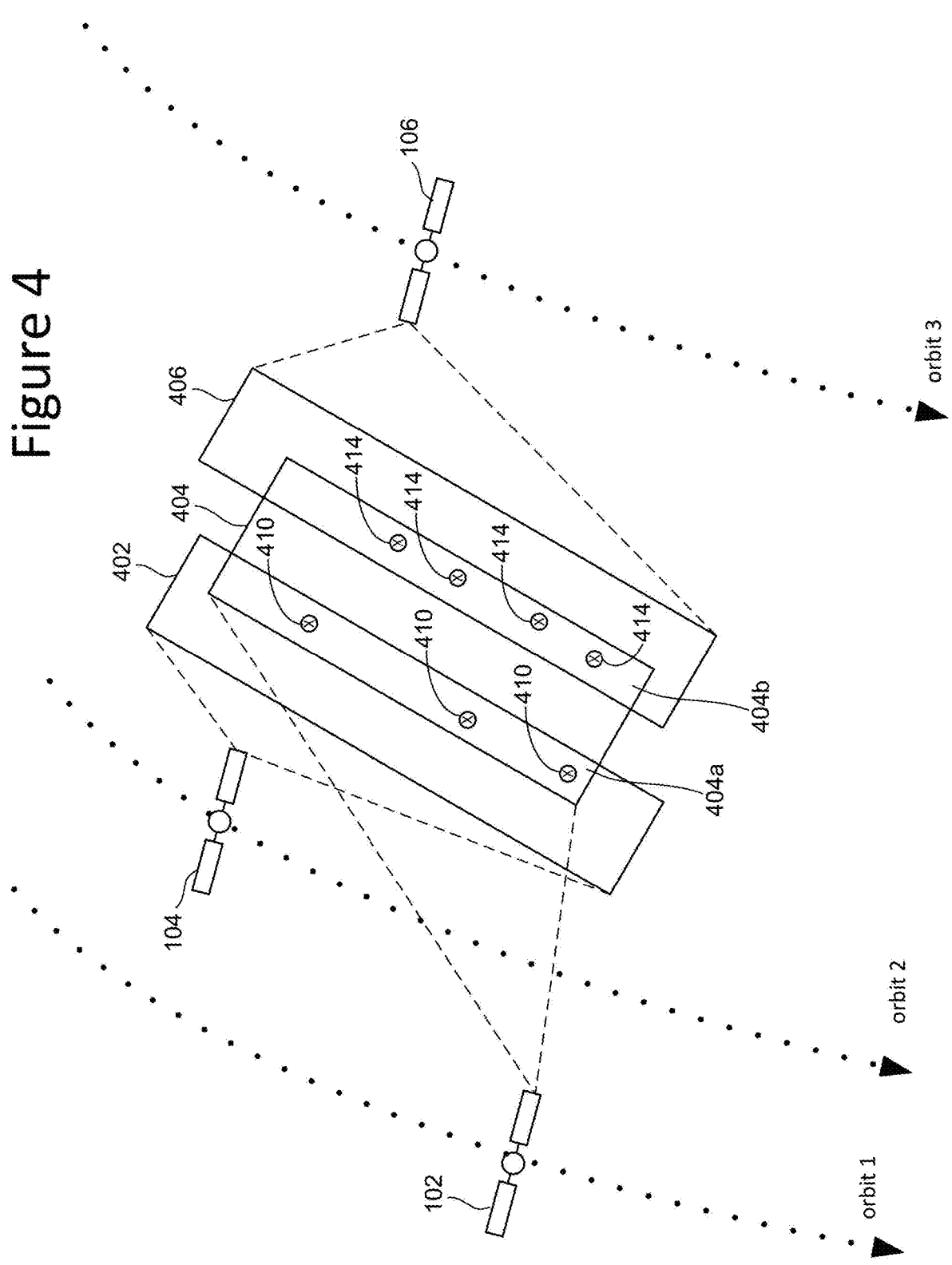

ABSOLUTE GEOSPATIAL ACCURACY MODEL FOR REMOTE SENSING WITHOUT SURVEYED CONTROL POINTS

BACKGROUND

The use of satellite-based and aerial-based imagery is popular among government and commercial entities. To such entities, it can be useful to piece together thousands of separate images (referred to herein as input images) taken from satellites (or other remote sensors) into a mosaic. For purposes of this document, a mosaic is a composite image created by arranging together a plurality of smaller images (the input images). In addition to mosaics, it can also be useful compare a temporal stack of images, which need to be co-aligned in order to compare them over time. Many applications of satellite imagery require that the absolute geospatial accuracy to be below some threshold for the satellite imagery to be valuable. The absolute geospatial accuracy refers to the difference between an object in an image and the true location of that object on the earth. Hence, having the absolute geospatial accuracy below some threshold is desirable.

Surveyed control points may be used to determine absolute geospatial accuracy in a set of images, such as satellite-based or aerial-based imagery. A surveyed control point has a defined coordinate in a coordinate reference system. An example of surveyed control points are ground control points (GCP), which are defined as points of known locations on the earth that are used to geo-reference imagery, such as Landsat Level-1 imagery. A GCP is typically a photo-recognizable feature, such as a feature on the surface of the earth that can be readily identified in an aerial or satellite image. The term absolute geospatial accuracy, for purpose of this document, is the degree to which a point in an image conforms to its correct location on the earth as defined by a surveyed control point. Absolute geospatial accuracy is generally determined by measuring the imagery directly against known objects in the imagery. Most commonly this is by using surveyed GCPs. The GCPs may be measured into the imagery manually by an operator or by an automated correlation mechanism.

One technique for generating a GCP is for a human to go to the location of an object and measure the precise coordinates by, for example, GPS (Global Positioning System). A description and/or image of the object may also be captured such that the GCP can later be precisely identified in an aerial or satellite image. Unfortunately, it is often expensive or impossible to obtain surveyed GCPs for many parts of the earth. For example, political issues may make it impossible to obtain surveyed GCPs for points within a country. Also, geography may make it extremely expensive to perform the survey in some parts of the world.

It is very difficult to determine absolute geospatial accuracy in images in the absence of surveyed control points. Therefore, given that GCPs are expensive or impossible to obtain it is often difficult or expensive to determine absolute geospatial accuracy in a set of images, such as satellite-based or aerial-based imagery.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 depicts input images with tie points.

DETAILED DESCRIPTION

Figure 1:
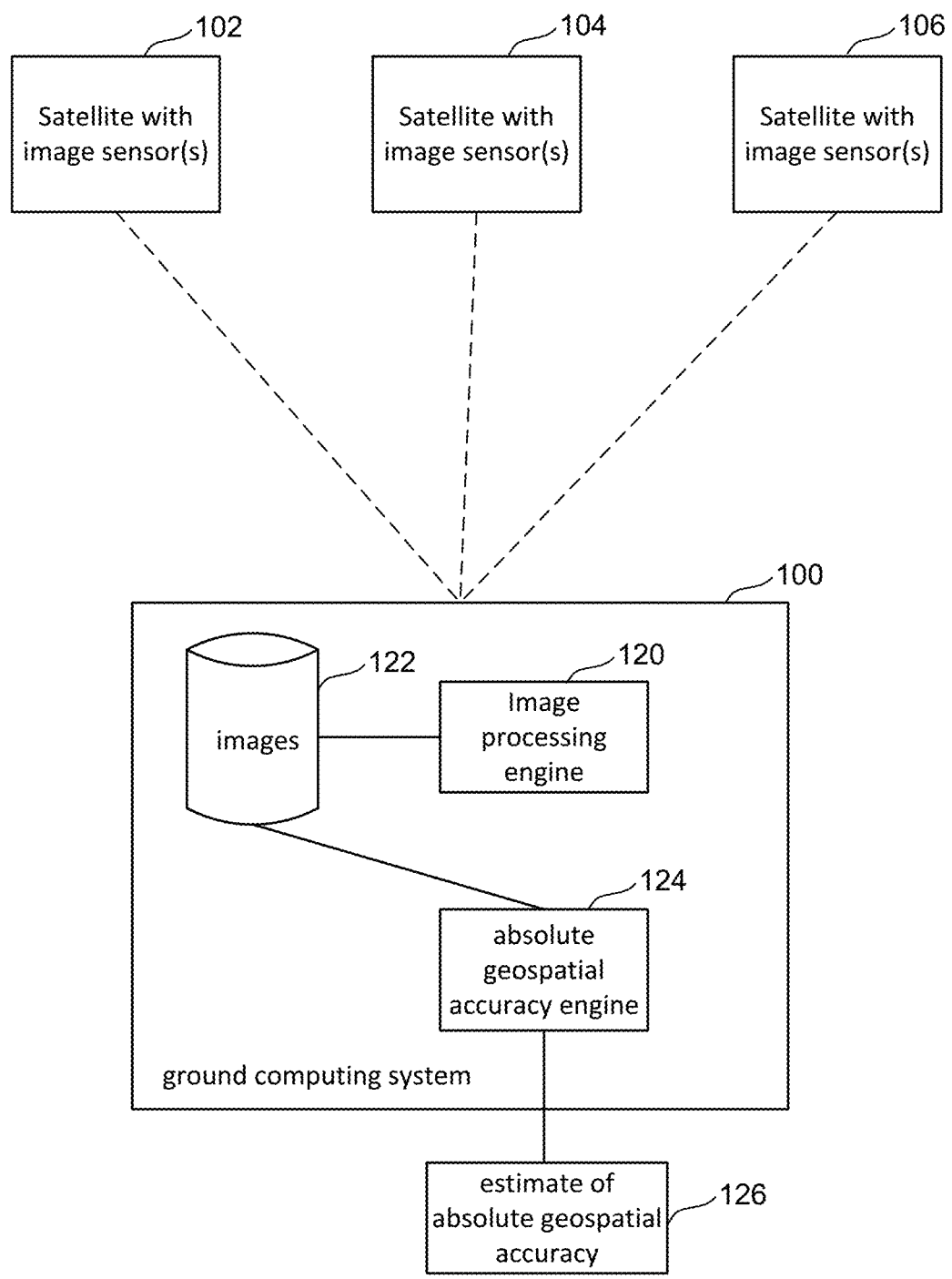
FIG. 1 is a block diagram of one example set of components that can implement the technology described herein.

Technology is disclosed herein for estimating absolute geospatial accuracy in a set of input images without the use of surveyed control points. For example, the absolute geospatial accuracy of a set of satellite images may be estimated without the use of GCPs. In an embodiment, the absolute geospatial accuracy of the set of input images is estimated based on a statistical measure of relative accuracies between pairs of overlapping images. This estimation may be made without absolute geospatial reference points, such as GCPs. In an embodiment, the estimation of the absolute geospatial accuracy includes determining a root mean square error of the relative accuracies between pairs of overlapping images. For example, the relative accuracies between respective pairs of the overlapping images may be based on a shear of each respective pair of overlapping images. In an embodiment, the absolute geospatial accuracy of the set of input images is estimated by determining a root mean square error of the shears of the respective pairs of overlapping images.

An embodiment includes calculating a confidence in the estimate of the absolute geospatial accuracy. This confidence may be based on the number of input images, the number of shear samples, etc. For example, if there are enough shear samples, the shear measurements may hover around some ground truth. Hence, even without any absolute geospatial reference points, an estimate of the absolute geospatial accuracy of the set of input images can be made.

The input images could be, but are not limited to, Level-1A images, Level-1B images, or orthorectified images. The input images could be prior to an adjustment (e.g., bundle adjustment) or post adjustment. The input images could cover different geographic regions, such that a mosaic may be formed from the images. The input images could be a time series of images of the same geographic region.

In an embodiment, GCPs are curated (e.g., selected for accuracy evaluation) based on the estimated absolute geospatial accuracy of the set of input images. Performing a detailed evaluation of the accuracy of each of the GCPs could be very expensive and time consuming. In an embodiment, for each GCP, the GCP is projected into the set of images to determine an absolute geospatial accuracy based on the GCP. The absolute geospatial accuracy based on the GCP is compared with the estimated absolute geospatial accuracy for the set of images. A large difference between the two may indicate that the GCP is not very accurate, and hence is a candidate for further evaluation. Time and expense is saved by limiting the number of GCPs that are further evaluated for accuracy.

In an embodiment, accuracy of a digital elevation map (DEM) of a geographic region is evaluated based on estimated absolute geospatial accuracies of two sets of images of the geographic region. The two sets of images may be, for example, Level 1B images and orthorectified images. Errors in the DEM may be determined based on differences between the estimated absolute geospatial accuracy of the set of orthorectified images and the estimated absolute geospatial accuracy of the set of Level 1B images. For example, a substantial DEM error may result in a poor absolute geospatial accuracy for the orthorectified images. Therefore, a large difference between the absolute geospatial accuracy for the orthorectified images and the Level 1B images may be a result of significant DEM error.

There are many other possible uses of the estimated absolute geospatial accuracy of one or more set of images. In one embodiment, a heatmap that indicates the estimated absolute geospatial accuracy for different geographic region is generated. In one embodiment, the estimated absolute geospatial accuracy for a set of images is to determine whether the images should be adjusted to meet a target absolute geospatial accuracy.

FIG. 1 is a block diagram of one example set of components that can implement the technology described herein. FIG. 1 shows a ground computing system 100 in wireless communication (e.g., RF or optical communication) with satellites 102, 104, and 106. Each of the satellites includes one or more image sensors. For example, each of the satellites can include push-broom or frame-type cameras for capturing images in the visual spectrum. Alternatively, these satellites can be used with image sensors to capture other electromagnetic bands such as SWIR, IR, SAR, multi-spectral or hyperspectral images. The satellites may be in various types of orbit including geostationary orbit, non-geostationary orbit, as well as other orbits. No particular structure for a satellite and no particular orbit is required. Although FIG. 1 shows three satellites, more or fewer than three satellites can be used.

Ground computing system 100 may include one or more computers acting together to perform the processes described below. In one embodiment, ground computing system 100 includes one or more processors for performing the methods described below and one or more non-transitory processor readable storage mediums that collectively store processor readable code that, when executed by the one or more processors, causes the one or more processors to perform the methods described below. Examples of non-transitory processor readable storage mediums include hard disk drives, flash memory, MRAM, other solid-state memory, RAM, ROM, etc. FIG. 1 shows ground computing system 100 including an image processing engine 120 and an absolute geospatial accuracy engine 124 in communication with an image store 122. In one embodiment, image processing engine 120 and absolute geospatial accuracy engine 124 are software modules running on one or more processors. In another embodiment, image processing engine 120 and absolute geospatial accuracy engine 124 are separate standalone electric circuits or separate processors programmed to operate as described below.

In one embodiment, image store 122 is a data structure for storing the set of images received from satellites 102, 104, and 106. Any type of database or data structure can be used. Thus, satellites 102, 104, and 106 are used to capture images, those images are transmitted wirelessly to ground computing system 100 for storage in image store 122, and then the images are processed by image processing engine 120. The images may also be processed by absolute geospatial accuracy engine 124. In some embodiments, the image processing engine 120 will store derivative images to the image store 122. For example, the image processing engine 120 may orthorectify images that were collected by the satellites, and store the orthorectified images to the image store 122. The derivative images may be processed by the absolute geospatial accuracy engine 124.

In one embodiment, absolute geospatial accuracy engine 124 estimates absolute geospatial accuracy in a set of the images without the use of surveyed geospatial reference points. The absolute geospatial accuracy engine 124 outputs the estimate of absolute geospatial accuracy 126. The estimate 126 may be stored in a non-transitory processor readable storage medium, and may be used as an input for various automated processes. In one embodiment, the estimate of absolute geospatial accuracy 126 is used to evaluate (e.g., curate) GCPs. In one embodiment, the estimate of absolute geospatial accuracy 126 from two sets of images may be used to evaluate a DEM. In one embodiment, the estimate of absolute geospatial accuracy 126 for a set of images may be used to determine whether to adjust the images to meet a target absolute geospatial accuracy. In one embodiment, the absolute geospatial accuracy engine 124 produces an estimate of absolute geospatial accuracy 126 for one set of images. In one embodiment, the absolute geospatial accuracy engine 124 produces estimates of absolute geospatial accuracy 126 for sets of images that cover different geographic regions. In one embodiment, the absolute geospatial accuracy engine 124 generates and outputs an accuracy heatmap that depicts the absolute geospatial accuracy for images that cover different geographic regions. Further details are discussed below.

Figure 2:
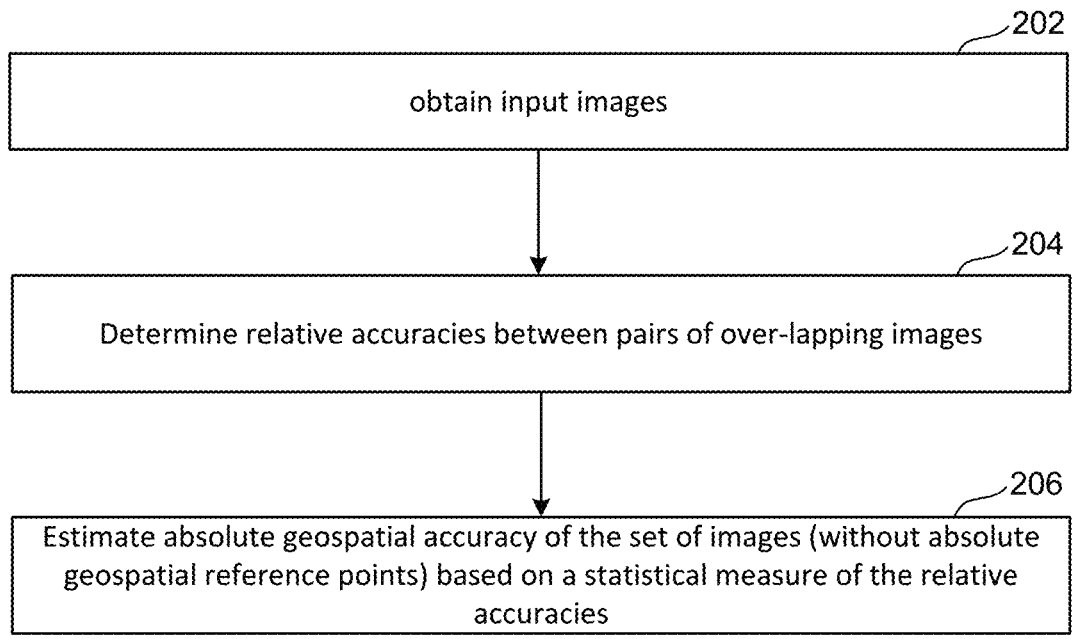
FIG. 2 is a flowchart describing one embodiment of a process of estimating an absolute geospatial accuracy for a set of images without the use of surveyed geospatial reference points.

FIG. 2 is a flowchart describing one embodiment of a process of estimating an absolute geospatial accuracy for a set of images without the use of surveyed geospatial reference points. The process of FIG. 2 is performed by components depicted in FIG. 1. In step 202 of FIG. 2, the system obtains input images. These input images may include, but are not limited to, Level 1A images, Level 1B image, and orthorectified images. The images could be from the satellites 102, 104, and 106 prior to processing by the image processing engine 120. For example, the images could be Level 1A images or Level 1B images of a portion of the earth's surface. However, the images could be processed by the image processing engine 120. For example, the images could be derivative images (e.g., orthorectified images), which may be generated by the image processing engine 120. The images could be prior to an adjustment (e.g., bundle adjustment) or post adjustment). The input images could cover different geographic regions, such that a mosaic may be formed from the images. The input images could be a time series of images of the same geographic region.

In an embodiment, the input images obtained in step 202 include overlapping images that are from a plurality of sensors at different perspectives (as noted above, the images can be processed by the image processing engine 120, such as orthorectified images). For example, multiple satellites can obtain images that depict at least a common portion of the earth's surface such that the images are overlapping. However, because these satellites are in different orbits, the perspective of the satellites will be different. In one embodiment, each of the images include metadata. Examples of metadata include attitude of the satellite (or attitude of the sensor on the satellite) and/or ephemeris data for the satellite (and/or ephemeris data for the sensor). In one example embodiment, ephemeris data includes location of the satellite and time of taking the data for the location. In some embodiments, the image sensors can be on different vehicles or structure other than satellites.

In step 204 of FIG. 2, the system determines relative accuracies between pairs of overlapping images. The system may look for common points that are in pairs of overlapping images. In one embodiment, the common points are tie points. In an embodiment, a surface coordinate position is determined for the respective common points. For example, image to ground rays may be projected to a surface model or DEM. In one embodiment, the relative accuracies are determined based on embedded georeferenced data in orthorectified images. The embedded georeferenced data indicates surface coordinate positions for respective points in the orthorectified images. The system may determine a shear for each pair of overlapping images. The shear may be based on the common points that are in a pair of overlapping images. The shear for a pair of overlapping images represents the relative accuracy for that pair of images.

In step 206 of FIG. 2, the system estimates absolute geospatial accuracy of the set of images based on a statistical measure of the relative accuracies. This estimate may be performed without any absolute geospatial reference points. For example, the estimate may be made without any GCPs. In one embodiment, the system determines a root mean square error of the relative accuracies of the pairs of overlapping images. In one embodiment, the system determines a root mean square error of the shear of each pair of overlapping images. In an embodiment, the absolute geospatial accuracy is determined for one dimension (e.g., an x-dimension or a y-dimension). Equation 1 may be used to estimate the absolute geospatial accuracy for the x-dimension.

$$E[X] \approx \sqrt{\frac{\sum_{i=1}^{k} d_{xi}^2}{2k}} \quad (1)$$

Equation 1 states that the Expectation of the absolute geospatial accuracy for the x-dimension is approximately equal to the expression on the right. The right side may be referred to as the root mean square error. In an embodiment, the term "$d_{xi}$" is the shear in the x-direction for the $i_{th}$ pair of overlapping images. There are k shear samples.

In a similar manner, the absolute geospatial accuracy for the y-dimension may be estimated as indicated in Equation 2. In an embodiment of Equation 2, the term "$d_{yi}$" is the shear in the y-direction for the $i_{th}$ pair of overlapping images.

$$E[Y] \approx \sqrt{\frac{\sum_{i=1}^{k} d_{yi}^2}{2k}} \quad (2)$$

In an embodiment, the absolute geospatial accuracy is estimated for two dimensions. In an embodiment of Equation 3, the term "$d_{xi}$" is the shear in the x-direction for the $i_{th}$ pair of overlapping images, and the term "$d_{yi}$" is the shear in the y-direction for the $i_{th}$ pair of overlapping images.

$$E(C) \leq \sqrt{\frac{\sum_{i=1}^{k} (d_{xi}^2 + d_{yi}^2)}{2k}} \quad (3)$$

In Equations 1-3, the estimate of the absolute geospatial accuracy is provided in terms of RMSE. Note that this is a weighted RMSE in that the summation is divided by 2 k (i.e., two times the number of shear samples). In an embodiment, a lower value for the absolute geospatial accuracy corresponds to better accuracy (i.e., a lower error). In one embodiment, the estimate of the absolute geospatial accuracy is provided as a CE90 value. For example, a CE90 estimate may be inferred from the RMSE based on a scaling factor.

In an embodiment, the equations used to estimate the absolute geospatial accuracy account for non-ideal factors such as noise and bias. Equation 4 is an alternative to Equation 3, by including terms for unmodeled error. Similar modifications can be made to Equations 1 and 2.

$$E_{scaled} \cong N(s_1, s_2, \ldots, s_n E(C)) \quad (4)$$

In Equation 4, the terms $s_n$ account for unmodeled or empirically known error, e.g. point matching error, uncorrected bias, sensor attitude and ephemeris noise, etc. Values for some of these terms can be derived empirically from a tie point matching and adjustment process (see discussion with respect to FIG. 4-7 below for further details of a tie point matching and adjustment process). For example, one or more of the terms may include a bias factor that can be used to account for a systemic pointing bias in a camera. Note that in some cases, it might not be possible to properly calibrate the camera because, for example, the camera is not owned or operated by the entity that is analyzing the images. However, such a systemic bias can be detected by, for example, validating the data with GCPs. In one embodiment, one or more of the terms $s_n$ are derived by calibrating the system by comparison to measurements when GCPs are available, and if the terms $s_n$ are consistent, they can be applied globally. When there are no additional factors contributing the measurable issues, Equation 3 may be used directly.

In one embodiment, the system calculates a confidence in the estimate of the absolute geospatial accuracy of the set of input images based on the number of images in the set of input images. In some cases, about 60 images may be sufficient to generate a sufficient confidence in the estimate of the absolute geospatial accuracy to use estimate for further processing. In one embodiment, Chernoff Bounds are used to calculate a confidence in the estimate of the absolute geospatial accuracy.

After performing the process of FIG. 2 on one set of images, the process can be performed on another set of images to estimate the absolute geospatial accuracy of that set of input images. In one embodiment, the estimate of the absolute geospatial accuracy of different sets of images could be used to evaluate a digital elevation map (DEM) for errors. For example, the process can be performed on a set of Level 1B images and a set of orthorectified images. The differences in the absolute geospatial accuracies may be used to evaluate accuracy in a DEM.

As will be discussed below, the estimate of the absolute geospatial accuracy may be used to identify GCPs that may have suspect accuracy. As will be discussed below, the estimate of the absolute geospatial accuracy for many sets of images may be used to generate an absolute geospatial accuracy heatmap. As will be discussed below, the estimate of the absolute geospatial accuracy may be used to determine whether to adjust the images to meet a target absolute geospatial accuracy.

Figure 3:
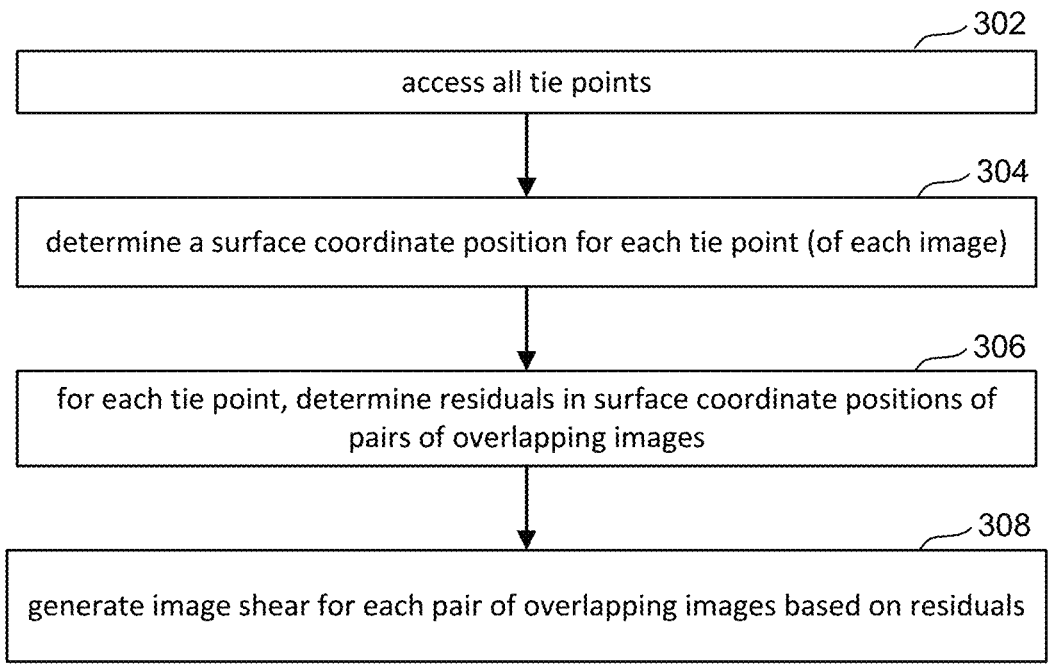
FIG. 3 is a flowchart of one embodiment of a process of determining relative accuracies between pairs of overlapping images.

In some embodiments, the process of FIG. 2 is performed on Level 1B images. FIG. 3 is a flowchart of one embodiment of a process of determining relative accuracies between pairs of overlapping images. The images may be Level 1B images. The process of FIG. 3 may be used in step 204 of FIG. 2. In step 302, the system performs automatic tie point generation. A tie point (TP) is a specific location that is recognizable in the overlap area between two or more images. The image positions of tie points in the overlap areas can be identified and measured manually or automatically. Automatic tie point generation can be performed using normalized cross correlation, feature matching, mutual information or least squares matching. The resulting tie point matching point coordinates in image space will later be projected ortho-projection space via a camera model, as discussed below.

FIG. 4 provides an example of step 302. FIG. 4 show satellites 102, 104, and 106 in separate orbits. Satellite 102 is in orbit 1, satellite 104 is in orbit 2, and satellite 106 is in orbit 3. Each of the satellites includes a sensor for taking a digital photograph of a same area on the earth's surface. Satellite 102 has captured image 404, satellite 104 has captured image 402, and satellite 106 has captured image 406. Images 402, 404, and 406 are overlapping images in that the content depicted in three images overlap. For example, overlap area 404a depicts the overlap of image 402 and 404, and overlap area 404b depicts the region of overlap between images 404 and 406. Images 402, 404, and 406 were captured by satellites 102, 104, and 106 and sent to ground computing system 100 as part of step 202 of FIG. 2. Image overlap area 404a includes a series of tie points 410. Thus, tie points 410 are in both images 402 and 404. Image overlap area 404b includes tie points 414. Thus, tie points 414 are in both images 404 and 406. Although FIG. 4 shows seven tie points, it is contemplated that in other embodiments, more or fewer than the number of tie points will be included. In many embodiments, overlap regions and images will include many tie points. More information about tie points and automatic tie point generation can be found in U.S. Pat. Nos. 9,251,419 and 9,875,404, both of which are incorporated by reference herein in their entirety.

Returning again to the discussion of FIG. 3, in step 304, the system determines a surface coordinate position for each tie point. In one embodiment, the system projects each ray for each tie point for the adjusted images to a model. In one embodiment, the model is a DEM. In example implementations, the DEM used may be a digital terrain model or a digital surface model. In one embodiment, projecting each tie point to the DEM includes projecting a ray from the image sensor to the DEM. This ray is projected in ortho-projection space. The ray projection can be performed from basic reconstructed imagery using rigorous camera models (e.g., full sensor model or community sensor model) or a rational polynomial coefficients model. Step 304 may be performed prior to image adjustment or post image adjustment. Thus, in one embodiment, step 304 is performed prior to bundle adjustment. In one embodiment, step 304 is performed after bundle adjustment. More details of step 304 are provided below with respect to FIG. 6.

As noted, optionally, the system performs automatic bundle adjustment in step 304. Bundle adjustment is the process of refining a visual reconstruction to produce jointly optimal 3D structure in viewing parameter estimates. Optimal means that the parameter estimates are found by minimizing some cost function that quantifies the model fitting the error, and jointly that the solution is simultaneously optimal with respect to both structure and camera variations. The name refers to the 'bundles' of light arrays leaving each 3D feature and converging on each camera center which are adjusted optimally with respect to both feature and camera positions. Equivalently, unlike independent model methods, which merge partial constructions without updating the internal structure, in one embodiment all of the structure and camera primers are adjusted together in one bundle.

Bundle adjustment can be thought of as large sparse geometric parameter estimation problem, the parameters being the combined 3D feature coordinates, camera poses and calibrations. Almost everything can be applied to many similar estimation problems in vision, photogrammetry, industrial metrology, surveying and geodesy. Adjustment computations are a major common theme throughout measurement sciences and once their basic theories and methods are understood, they are easy to adapt to a wide variety of problems. Adaptation is largely a matter of choosing a numeric optimization scheme that exploits the problem structure and sparsity.

Classically, bundle adjustment computations are formulated as non-linear least-squares problems. The cost function is assumed to be quadratic in the feature reprojection errors, and robustness is provided by explicit outlier screening. Modern systems also use non-quadric M-estimator-like distributional models to handle outliers more integrally, and many include additional penalties related to overfitting, model selection and system performance (priors, MDL). For this reason, in some embodiments, it will not be assumed to use a least-squares/quadratic cost model. Instead, the cost can be modeled as a sum of opaque contributions from the independent information sources (individual observations, prior distributions, overfitting penalties, . . . ). The functional forms of these contributions and their dependence on fixed quantities such as observations will usually be left implicit. This allows many different types of robust and non-robust cost contributions to be incorporated, without unduly cluttering the notation or hiding essential model structure. It fits well with modern sparse optimization methods (cost contributions are usually sparse functions of the parameters) and object-centered software organization, and avoids many tedious displays of chain-rule results. Implementations are assumed to be capable of choosing appropriate functions and calculating derivatives themselves.

Bundle adjustment is known in the art. Many different types and functions for implementing bundle adjustment can be used with the present technology. Examples of methodology for bundle adjustment can be found in the following papers: Lourakis, M. I. A. and Argyros, A. A. 2009. SBA: A Software Package For Generic Sparse Bundle Adjustment, ACM Trans. Math. Softw. 36, 1, Article 2, March 2009, 30 pages, DOI=10.1145/1486525.148527; and Triggs, McLauchlan, Hartley, and Fitzgibbon, Bundle Adjustment A Modern Synthesis, International Workshop on Vision Algorithms, September 2000, Corfu, Greece, pp. 298-372, 10.1007/3-540-44480-7_21. inria-00548290, both of which were incorporated by reference herein in their entirety.

Figure 5A:
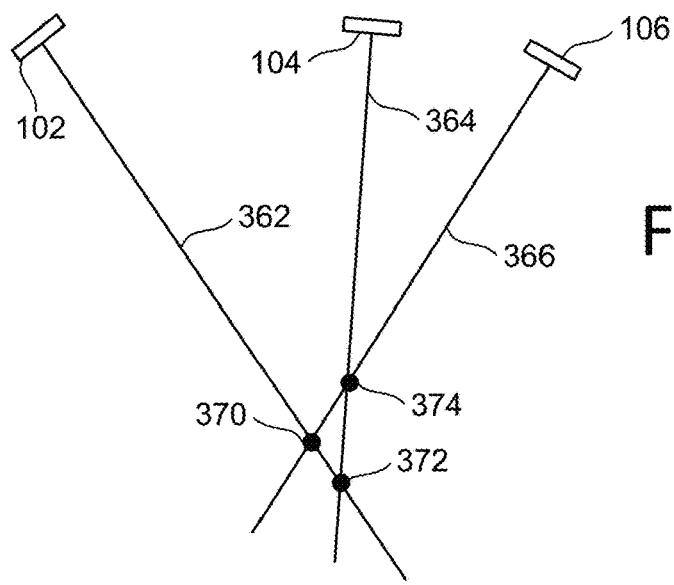
FIGS. 5A and 5B depicts projecting rays from image sensors.
Figure 5B:
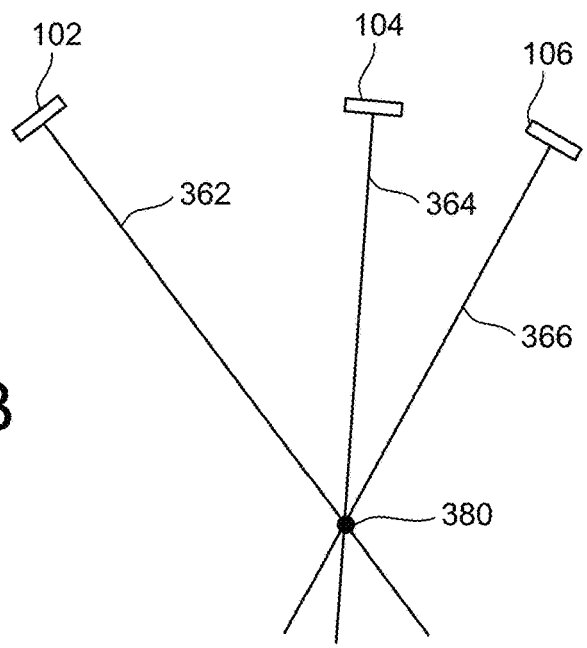

In one embodiment, each of the images captured by the satellites will include metadata. One example of the metadata is attitude of the satellite (e.g., where the satellite is pointing) and ephemeris data. In one example embodiment, the automatic bundle adjustment includes adjusting the attitude data and the ephemeris data to reduce errors. In another embodiment, the bundle adjustment includes only adjusting the attitude data. In another embodiment, the bundle adjustment includes only adjusting the ephemeris data. In another embodiment, the bundle adjustment includes adjusting other metadata to reduce error. The reduction of error, the goal of the bundle adjustment, is explained better with respect to FIGS. 5A and 5B. FIG. 5A shows satellites 102, 104 and 106 as image planes (as each includes an image sensor). A ray is depicted extending from each of the image planes for a common tie point in all three of the image planes. For example, ray 362 extends from satellite 102, ray 364 extends from satellite 104, and ray 366 extends from satellite 106. The rays may not intersect at all in 3-D space, a difficult thing to represent in drawings. But they will pass within some minimal distance of the idealized intersection (such as the one shown in FIG. 5B). However, for example purposes, FIG. 5A shows that these rays intersect: ray 362 intersects ray 364 at point 372, ray 362 intersects ray 366 at point 370, and ray 364 intersects ray 366 at point 374. All three rays are projections from the same tie point. If there was no error, then intersection point 370, 372, and 374 should be the same exact point. The fact that the three intersection points are separated is the error. Bundle adjustment seeks to reduce or eliminate this error. In an ideal embodiment, bundle adjustment will eliminate the error; however, in real life there will be many errors for many different tie points so bundle adjustment will do its best to minimize the error across all the tie points. FIG. 5B shows an example when bundle adjustment has removed the error. As can be seen, all three rays 362, 364, and 366 now intersect at a single common intersection point 380. Therefore; there is no error. This error was reduced by adjusting the metadata for example, adjusting the attitude data for one, two, or all three of the satellites 102, 104, 106 and/or adjusting the ephemeris data for one, two, or three of the satellites.

Figure 5C:
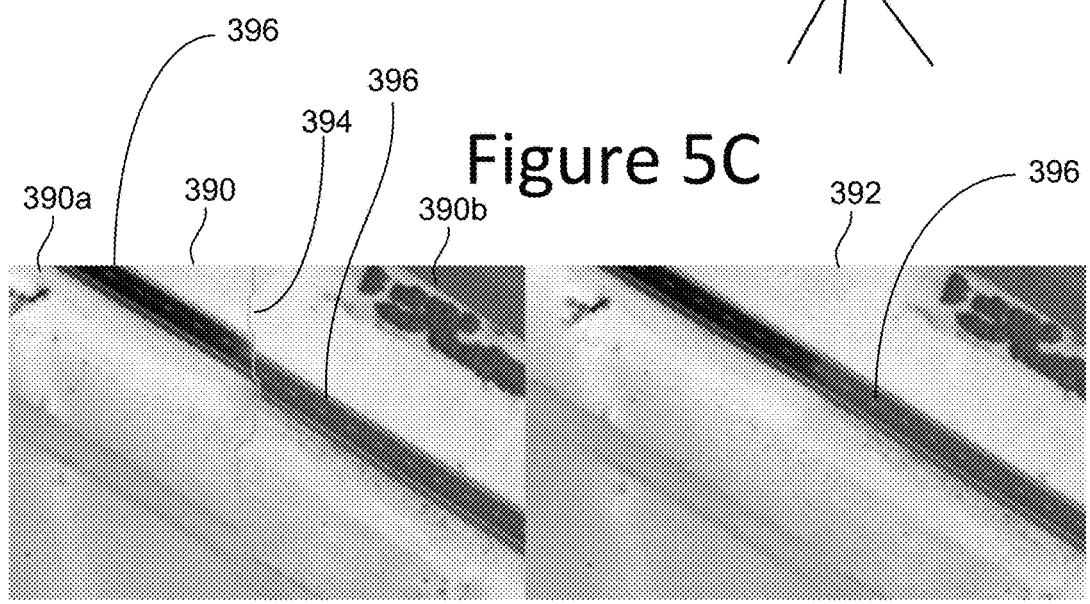
FIG. 5C depicts portions of two example orthorectified mosaics.

The effect of the bundle adjustment could also be described with respect to FIG. 5C, which shows two photographs 390 and 392. Photograph 390 is a portion of a mosaic where two images are stitched together, line 394 represents the seam between the two images. As can be seen, there is error in that images 390a and 390b do not line up perfectly along seam 394. For example, road 396 is depicted as misaligned at seam 394. The process of automatic bundle adjustment seeks to adjust the metadata (e.g., attitude data or ephemeris data) in order to arrive at image 392 where the road 396 is no longer is depicted as misaligned at the seam. In fact, in image 392, the seam cannot be detected. This effect is the result of improved accuracy in the metadata and is not to be confused with warping or distorting the imagery to achieve a blended seamline.

In one embodiment, the system performs the automatic bundle adjustment by projecting tie points to a model and performing triangulation among the intersection points (e.g., 370, 372, and 374) to determine a best point of intersection (e.g., 380) in the ortho-projection space for the rays projected for the points from the overlapping images. This altering of the metadata reduces the error.

Looking back at FIG. 3, in step 306, the system determines residuals in surface coordinate positions from pairs of overlapping images. In an embodiment, for each tie point, the system will determine the residuals in projections from pairs of overlapping images. As discussed above, rays projected from a tie point in a pair of overlapping images should intersect at a common intersection point (see discussion above). In an ideal world, that common intersection point will be on the DEM. But in a non-ideal world, the intersection point will be above or below the DEM. Therefore, the rays from each of the overlapping images for the same tie point will intersect the DEM at different locations on the DEM. Step 306 includes determining the residuals for each tie point. The residuals could be prior to bundle adjustment (see FIG. 5A) or after bundle adjustment (see FIG. 5B). In one embodiment, the residual is the difference between the locations of where two projections for a same tie point (but from different images) intersect the DEM. In one embodiment, determining the residuals for the projected points comprises determining relative distances along a plain in the ortho-projection space between intersection points for a common tie point. Thus, the residual is the difference in locations. More details of step 304 will be discussed below with respect to FIG. 7.

Figure 6:
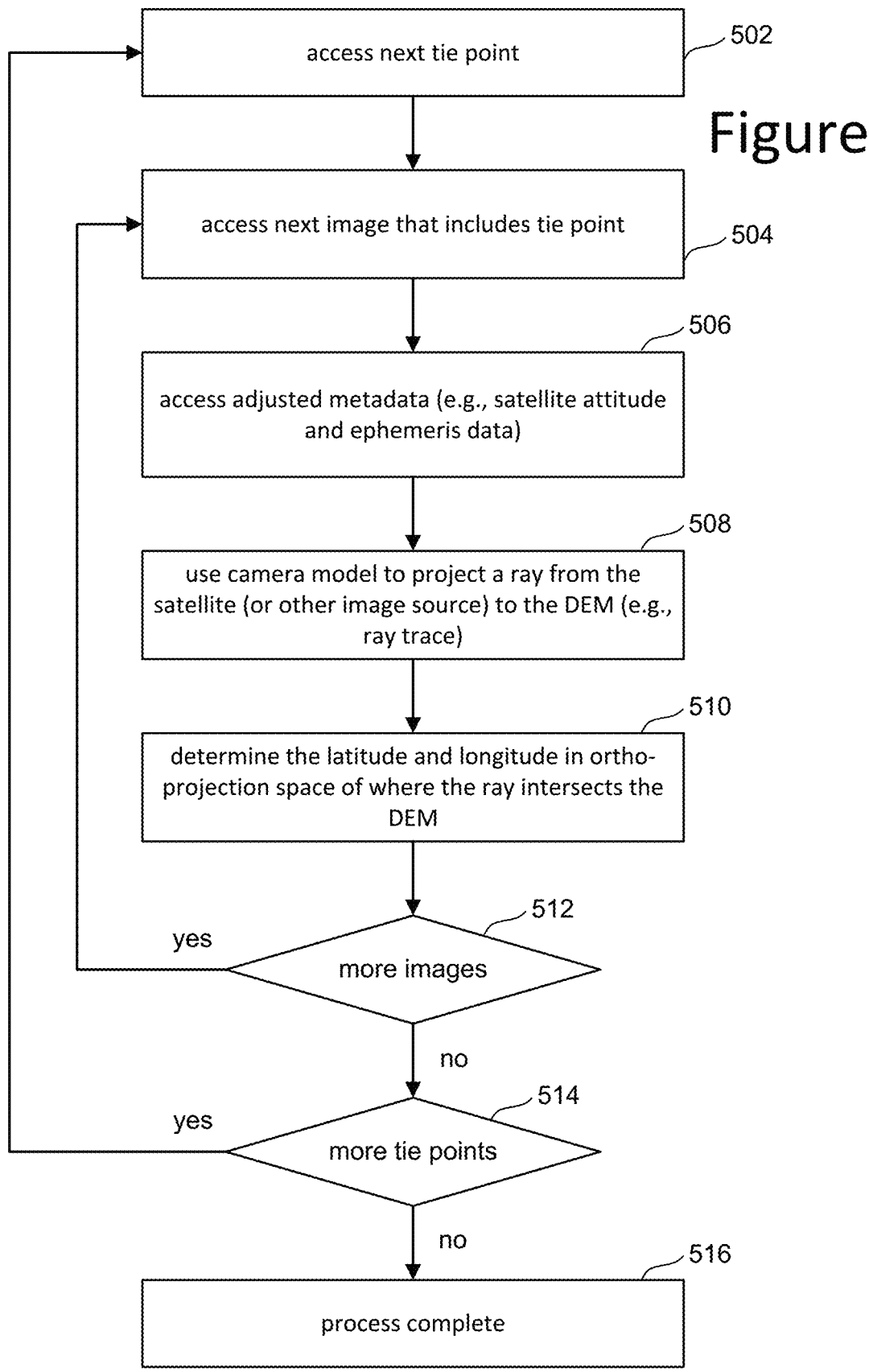
FIG. 6 is a flow chart describing one embodiment of a process for projecting tie points to a digital elevation model.

FIG. 6 is a flowchart describing one embodiment of projecting each tie point to the DEM for the adjusted overlapping images. That is the process of FIG. 6 may be used in step 304 of FIG. 3. The process of FIG. 6, in one embodiment, is performed by image processing engine 120. In step 502 of FIG. 6, the system accesses the next tie point. If this is the first iteration of FIG. 6, then the first tie point is accessed from the entire population of tie points. In step 504, the system will access the next image that includes that tie point. As discussed, each tie point appears in overlapping images. One of those overlapping images is accessed in step 504. In step 506, the system accesses the adjusted metadata (e.g., satellite attitude and/or ephemeris data) for the image accessed in step 504. In step 508, the system uses a camera model to project a ray from the satellite (or other image source) to the DEM (e.g., a ray trace). This ray is projected in ortho-projection space from the pixel location of the tie point in the input image to the DEM. In step 510, the system determines the latitude and longitude in ortho-projection space of where the ray intersects the DEM. Note that the original image is in an image space that has a different coordinate system than the ortho-projection space. The coordinate system of the ortho-projection space is the space that the DEM is in. The camera model is used to translate between image space and ortho-projection space. Translating between coordinate systems is well known in the art. In one embodiment, a series of matrix transformations can be used to project the ray from the satellite to the DEM in ortho-projection space.

Figure 7:
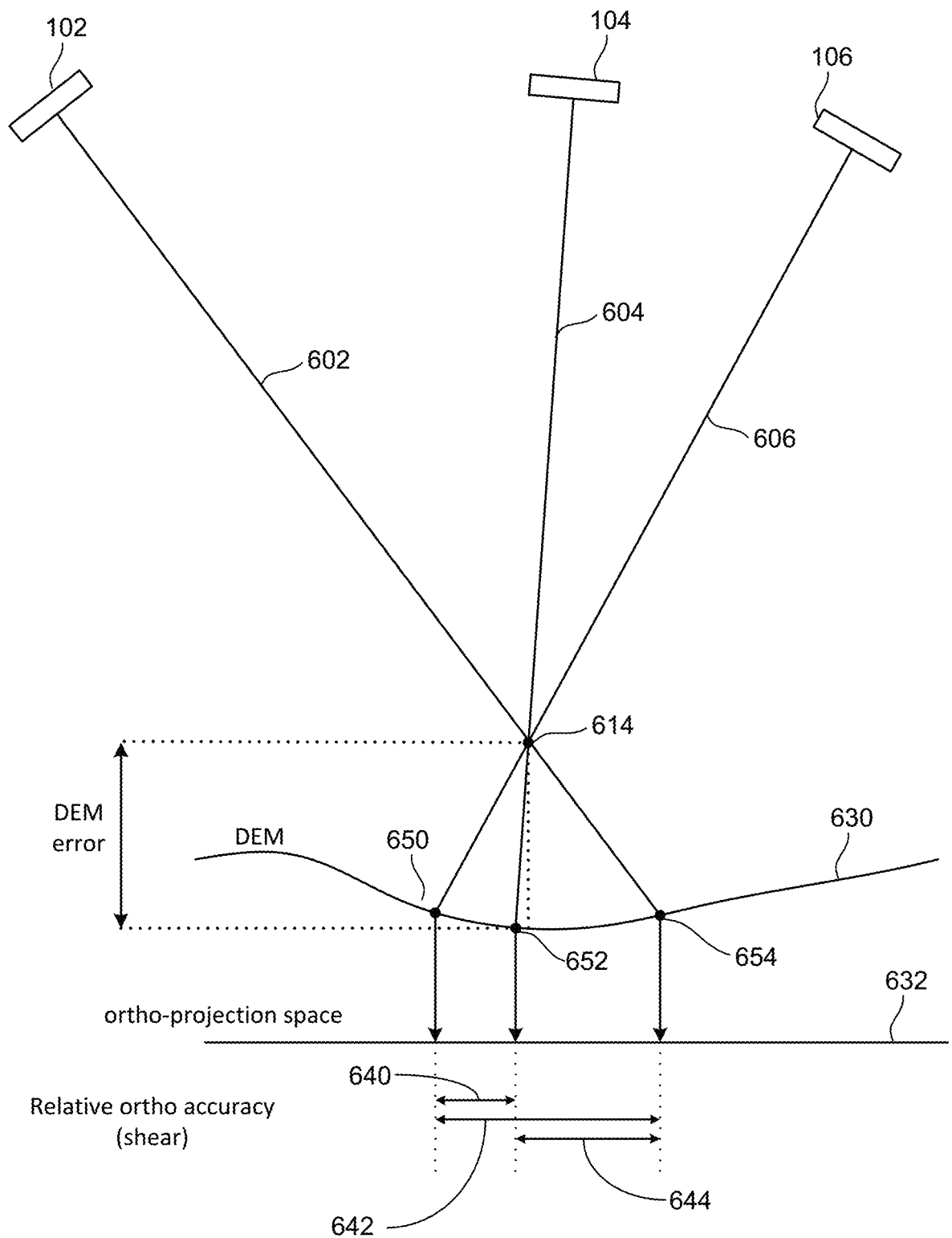
FIG. 7 illustrates one example of projecting tie points to a digital elevation model.

FIG. 7 illustrates one example of projecting tie points to a DEM. FIG. 7 shows satellites 102, 104, and 106. Rays are depicted that project from each of the satellites (or each of the images captured at the satellites) to the DEM for a common tie point. For example, ray 602 is projected from satellite 102, ray 604 is projected from satellite 104, and ray 606 is projected from satellite 106. Due to the bundle adjustment, all three rays (602, 604, 606) intersect at intersection point 614, which is depicted to be above DEM 630. The distance that intersection point 614 is above DEM 630 is referred to as the DEM error. FIG. 7 also shows where each of the rays 602, 604, 606 intersect DEM 630. For example, ray 606 intersects DEM 630 at intersection point 650, ray 604 intersects DEM 630 at intersection point 652, and ray 602 intersects DEM 630 at intersection point 654. Rays 602, 604, and 606 were generated in step 508 of FIG. 6. Intersection points 650, 652, and 654 are generated in step 510. For each of intersection points 650, 652 and 654, the system determines the latitude and longitude in ortho-projection space for those intersection points.

Step 306 of FIG. 3 includes determining residuals in surface coordinate positions from pairs of overlapping images. For example, step 306 may include determining the residuals between the intersection points (residual between the projection of the rays). In one embodiment, the residual is determined for the projected points by determining the relative distances along a plane (e.g., plane 632 in ortho-projection space) between intersection points for a common tie point. For example, FIG. 7 shows residual 640 between intersection points 650 and 652, residual 642 between intersection points 650 and 654, and residual 644 between intersection point 652 and 654. Thus, FIG. 7 shows that for accessed overlapping images that include a respective tie point, the system will project rays from the source of the input image to the DEM in ortho-projection space, determine latitude and longitude of the intersections points in ortho-projection space where the rays intersect the model and determine residuals for those intersection points (and for the rays) by determining relative distances along plane 632 (which is a plane in ortho-projection space).

Looking back at FIG. 6, after determining the latitude and longitude of where the rays intersect the DEM in step 510, the system determines whether there are more images that include the tie point being processed. If so, the process loops back to step 504 and accesses the next image and performs another iteration of steps 504-510. If there are no more images for this tie point, then in step 514 the system determines whether there are more tie points to consider and operate on. If so, then the process loops back to step 502 and performs another iteration of steps 502-512. If all the tie points have been processed, then the process of FIG. 6 is complete (step 516).

Looking back at FIG. 3, at the end of step 306, the system includes a set of difference numbers (residuals for each tie point) for all the tie points for the set of overlapping images. In step 308, the system generates image shears for each pair of overlapping images based on the residuals of step 306. For example, for each pair of overlapping images the system aggregates all of the residuals for those two images for tie points that they have in common and creates a shear.

After determining the shear for each pair of overlapping images based on the residuals, the estimate of absolute geospatial accuracy may be determined based on the shears. For example, any of Equations 1, 2 and/or 3 may be applied to the shears.

As noted above, the images for which the absolute geospatial accuracy is estimated could be a set of orthorectified images. In one embodiment, the image processing engine 120 generates the orthorectified images from images collected from the satellites 102, 104, 106. However, the orthorectified images could be provided from a different source. Hence, it is not a requirement that the image processing engine 120 in the ground computing system 100 generate the orthorectified images.

Figure 8:
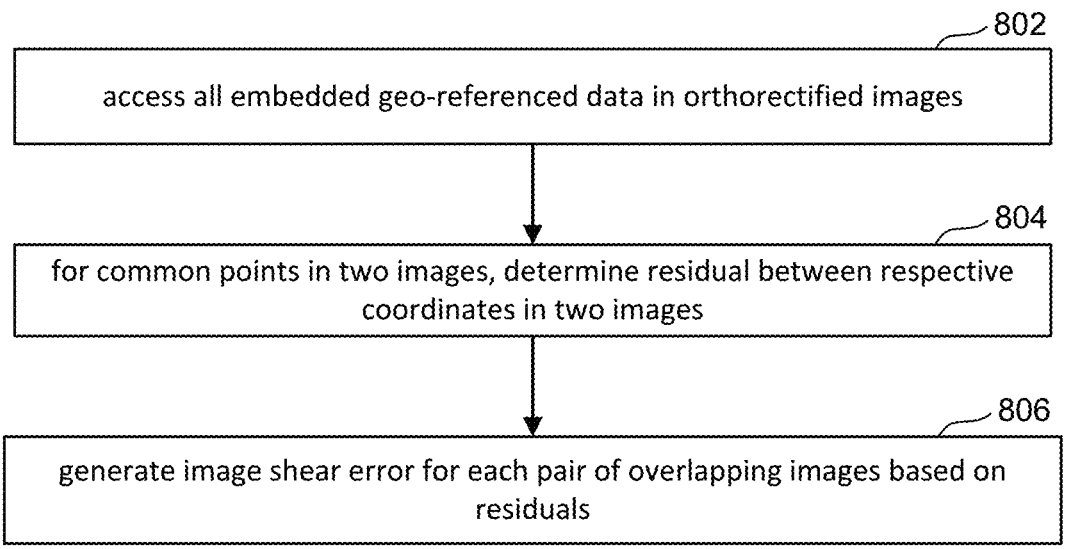
FIG. 8 is a flowchart of one embodiment of generating sheer errors for a set of orthorectified images.

FIG. 8 is a flowchart of one embodiment of generating shears for a set of orthorectified images. The process of FIG. 8 may be used in step 204 of FIG. 2. Hence, the process is FIG. 8 is one embodiment for determining relative accuracies between pairs of overlapping images. The process may be performed by image processing engine 120 and/or absolute geospatial accuracy engine 124. In step 802 the system accesses embedded geo-referenced data in the orthorectified images. The embedded geo-referenced data may be metadata that indicates coordinates for the respective pixels (or some other point in the image). In an embodiment, the coordinates are in the ortho-projection space (see FIG. 7).

In step 804 the system determines, for common points in two images, a residual between the respective coordinates in the two images. This is similar to determining the residuals between the tie points that was discussed with respect to step 306 of FIG. 3. The common points in step 804 could be tie points, but are not required to be tie points.

In step 806, the system generates a shear for each pair of overlapping images based on the residuals of step 804. For example, for each pair of overlapping images the system aggregates all of the residuals for those two images for tie points that they have in common and creates a shear. After determining the shear for each pair of overlapping images based on the residuals, the estimate of absolute geospatial accuracy may be determined based on the shears. For example, any of Equations 1, 2 and/or 3 may be applied to the shears.

Figure 9:
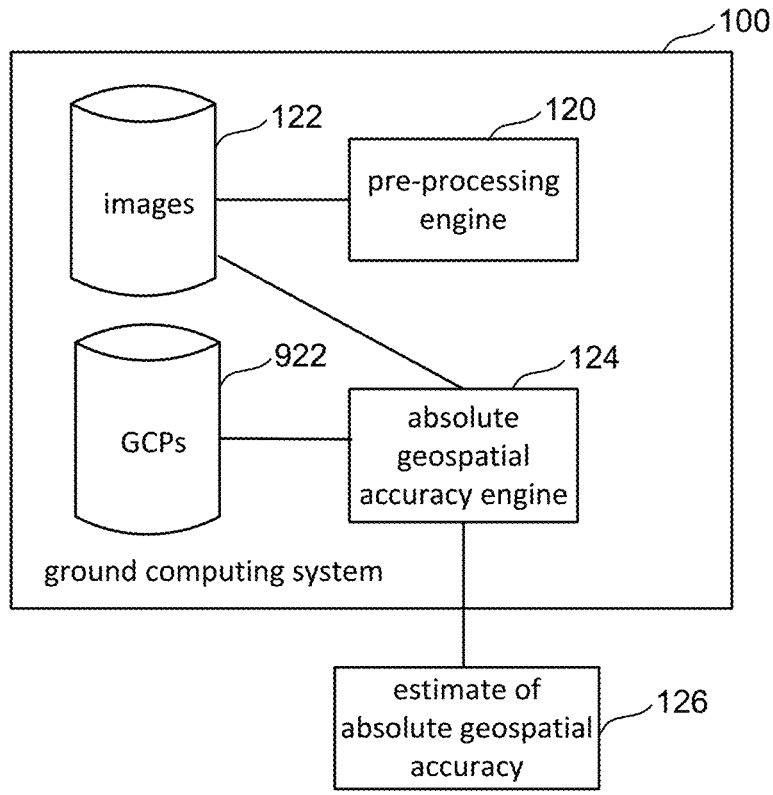
FIG. 9 depicts one embodiment of the ground computing system having a ground control point database.

There are a variety of practical uses for the estimated absolute geospatial accuracy of the set of images. In an embodiment, GCPs are selected for accuracy evaluation based on the estimated absolute geospatial accuracy of the set of images. FIG. 9 depicts one embodiment of the ground computing system 100 having a GCP database 922. In an embodiment, the ground computing system 100 is used to curate the GCP database 922. Curating (or filtering) the GCP database 922 involves evaluating the accuracy of the GCPs. Performing a detailed evaluation of the accuracy of each of the GCPs could be very expensive and time consuming. For example, the GCP database 922 may contain thousands, hundreds of thousands, or even more GCPs.

Figure 10:
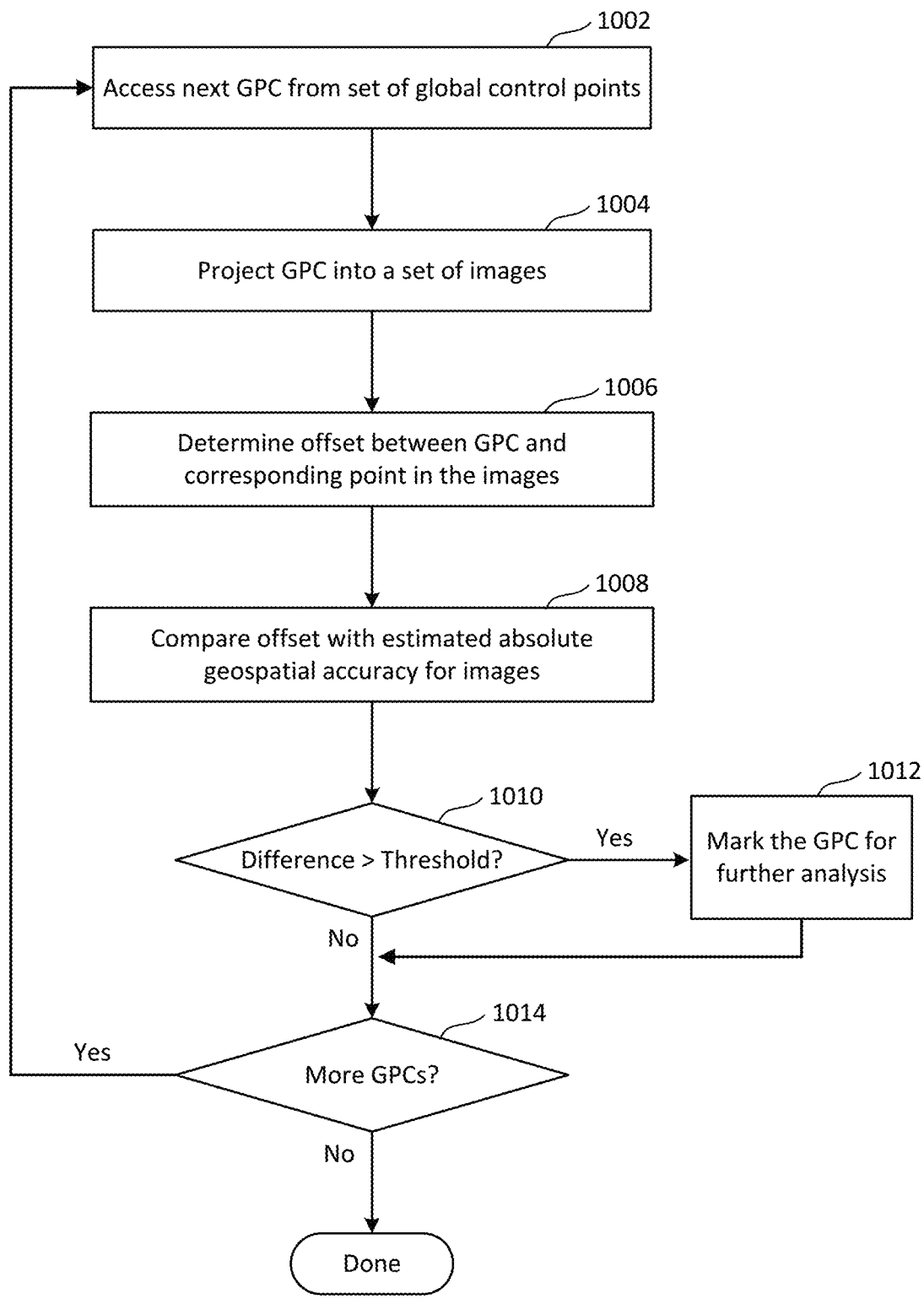
FIG. 10 is a flowchart of one embodiment of curating ground control points.

FIG. 10 is a flowchart of one embodiment of curating (or filtering) GCPs. The process may be used to reduce the number of GCPs for which a more detailed evaluation is performed. The process may be performed by image processing engine 120 and/or absolute geospatial accuracy engine 124. In step 1002, the system accesses the next GCP from a set of GCPs 922.

Figure 11:
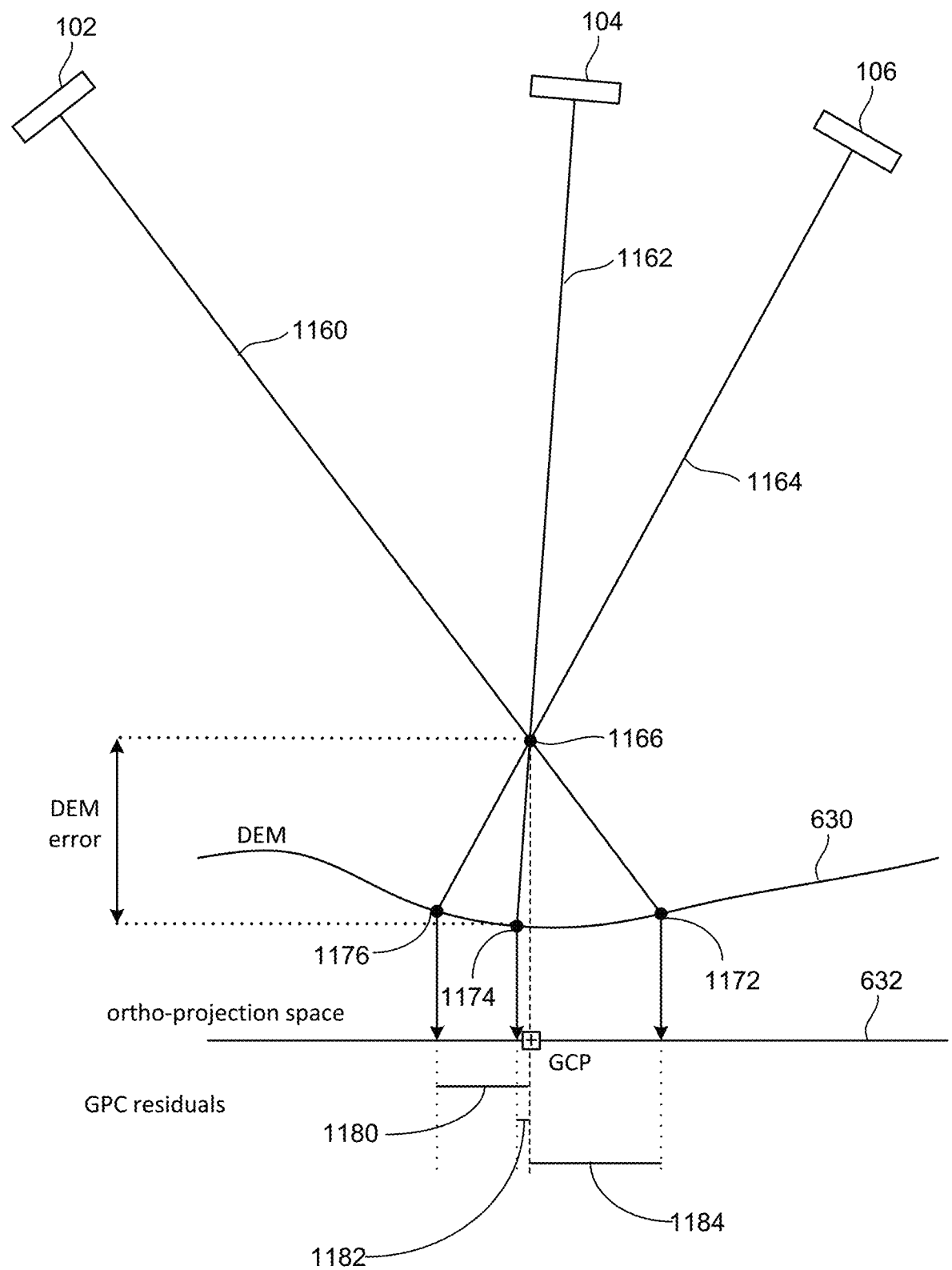
FIG. 11 shows ground control point residuals, which represent the difference between the ground control point and a tie point in the ortho-projection space.

In step 1004, the system projects the GCP into a set of images. For example, with respect to FIG. 11, the system may project the GCP into the ortho-projection space, based on the coordinates of the GCP. For the sake of example, the GCP may correspond to a tie point. FIG. 11 shows satellites 102, 104, and 106, each of which has captured a separate image (overlapping images) that include the same ground control point (GCP). The system projects a ray from each satellite to the DEM. For example, ray 1160 is projected from satellite 102 to DEM 630, ray 1162 is projected from satellite 104 to DEM 630, and ray 1164 is projected from satellite 106 to DEM 630. The three rays 1160, 1162, and 1164 intersect at intersection point 1166. However, intersection point 1166 is above DEM 630, representing the DEM error. Ray 1160 intersects DEM 630 at intersection point 1172, ray 1162 intersects DEM 630 at intersection point 1174, and ray 1164 intersects DEM 630 at intersection point 1176.

In step 1006, the system determines an offset between the projected intersection points (1172, 1174, 1176), and the actual ground control point GCP. This is indicated as a difference along plane 632 in ortho-projection space. For example, the residual between the projection of ray 1164 and the ground control point is residual 1180, the residual for projection of ray 1162, and the ground control point GCP is residual 1182, and the residual for the projection of ray 1160 and ground control point GCP is residual 1184. These residuals 1180, 1182, and 1184 represent absolute geospatial residuals. The system may determine a single number that represents the residuals 1180, 1182, and 1184. As examples, the single number could be the mean, the worst case, or the best case of the residuals 1180, 1182, and 1184.

In step 1008, the system compares the offset to the estimated absolute geospatial accuracy of the set of images. Recall that the estimated absolute geospatial accuracy is a characterization of the set of images, as opposed to a specific tie point. A large difference between the estimated absolute geospatial accuracy and the offset might indicate that the GCP is not accurate (has suspect accuracy). In other words, the error in the coordinates of the GCP might be greater than a target threshold.

In step 1010, the system determines whether the difference calculated in step 1008 is greater than a threshold. A high difference may be an indication that the GCP should be further analyzed for accuracy. In step 1012, the system marks the GCP for further analysis if the difference exceeds the threshold. For example, the system places the GCP on a list of GCPs for further analysis. If the difference calculated in step 1008 is less than the threshold this may be an indication that the GCP is not a candidate for further analysis of the accuracy of the GCP. Hence, the GCP is not marked for further analysis. In step 1014, the system determines whether there is another GCP in the GCP database 922. If so, that GCP is analyzed in the next iteration of the process of FIG. 10.

Figure 12:
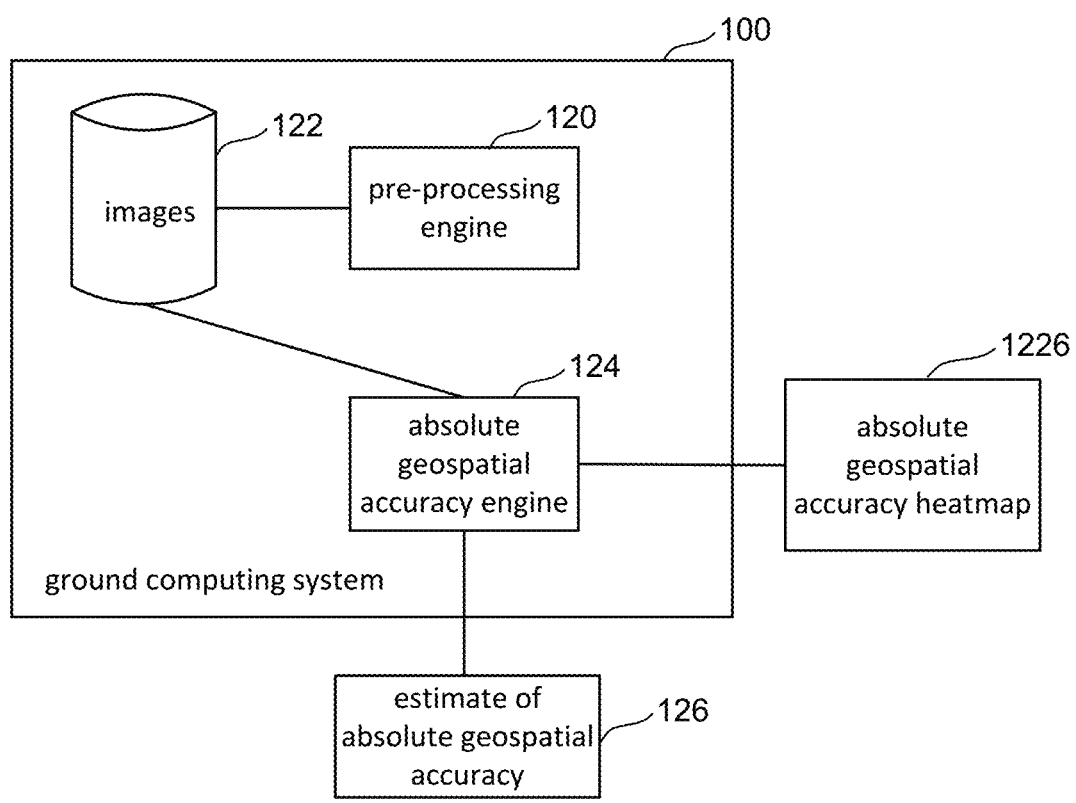
FIG. 12 depicts one embodiment of the ground computing system that generates and outputs an absolute geospatial accuracy heatmap.

Another practical use for the estimated absolute geospatial accuracy is to generate a heatmap that indicates the estimated absolute geospatial accuracy for different geographic regions. FIG. 12 depicts one embodiment of the ground computing system 100 in which the absolute geospatial accuracy engine 124 generates and outputs an absolute geospatial accuracy heatmap 1226.

Figure 13:
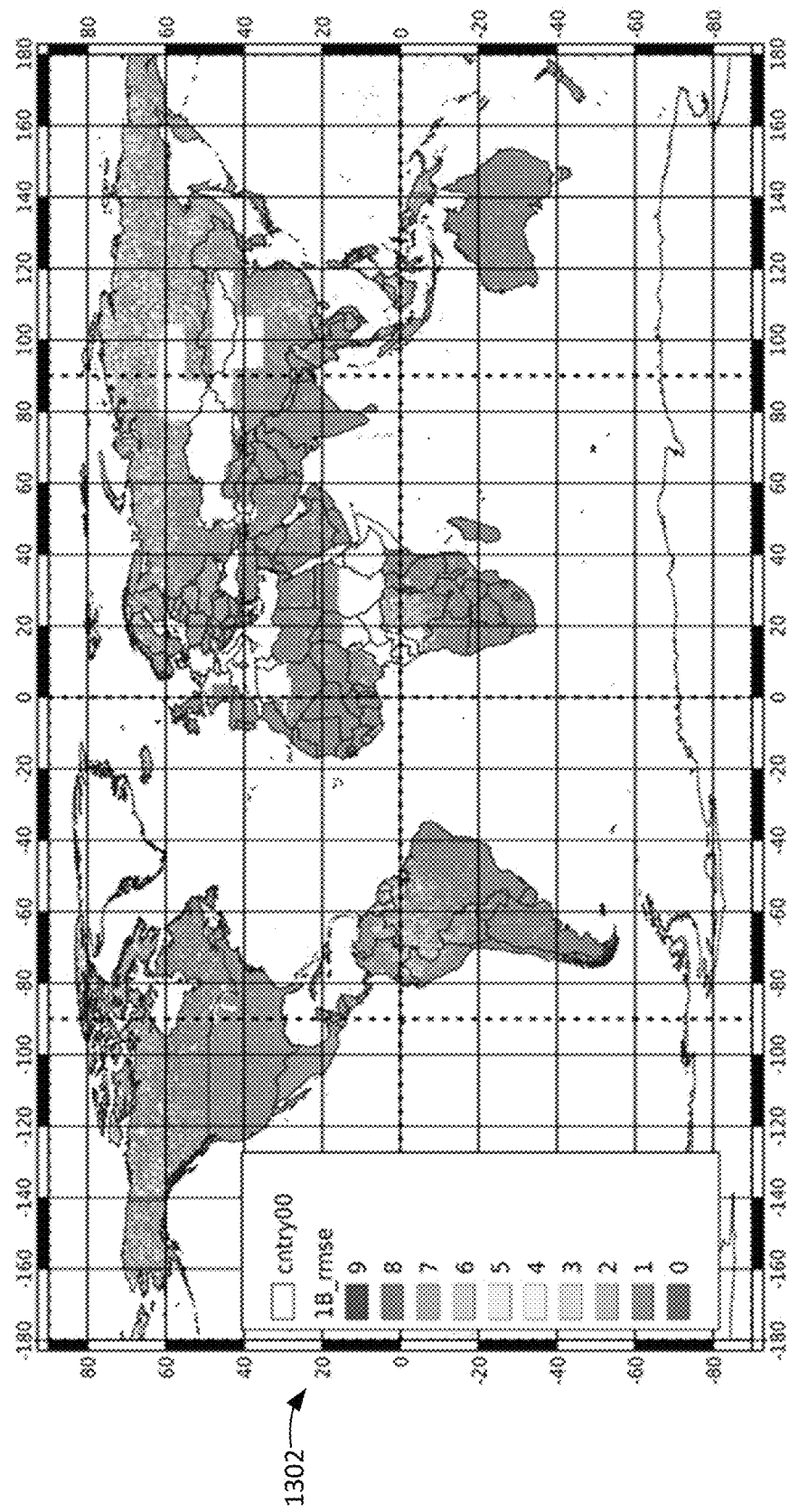
FIGS. 13 and 14 depict absolute geospatial accuracy heatmaps.

FIG. 13 depict an absolute geospatial accuracy heatmap 1226a, which may be generated by the absolute geospatial accuracy engine 124. The heatmap 1226a visually depicts estimates of absolute geospatial accuracy for different parts of the world. The heatmap 1226a may be generated based on processing of many different sets of images. Some of these sets may cover the same geographic region. A separate estimate of absolute geospatial accuracy may be generated for each set of images. The heatmap 1226a is for Level 1B images.

The heatmap 1226a is made up of pixels, with each pixel having a value that represents the absolute geospatial accuracy. In one embodiment, a color is used to represent the value of the absolute geospatial accuracy, although some other physical parameter could be used to represent the value of the absolute geospatial accuracy. The legend 1302 indicates that colors may be used to represent the value of the absolute geospatial accuracy. In this example, the absolute geospatial accuracy is calculated as a root mean square error (RMSE). A lower value for the absolute geospatial accuracy represents higher accuracy. The legend 1302 shows ten different colors, which correspond to the numbers 0-9. Note that the numbers 0-9 could be the RMSE, or could be scaled to represent the RMSE. As one example, the color blue could be user for 0, green for 2, orange for 7, red for 9, etc. Intermediate colors can be used for the other numbers. If there is no data for a region, the pixel can be left blank (e.g., white). In FIG. 13, most of the points on the map have a RMSE between 0-1, as can be seen by most of the pixels being blue or blue-green. Hence, the absolute geospatial accuracy for the Level 1B images is very good. Some regions are white to indicate that there is no data for that region. For example, some parts of central Africa (e.g., Ethiopia, Sudan) and some parts of Asia (e.g., Mongolia, northern China) are white to indicate a lack of data for those regions.

Figure 14:
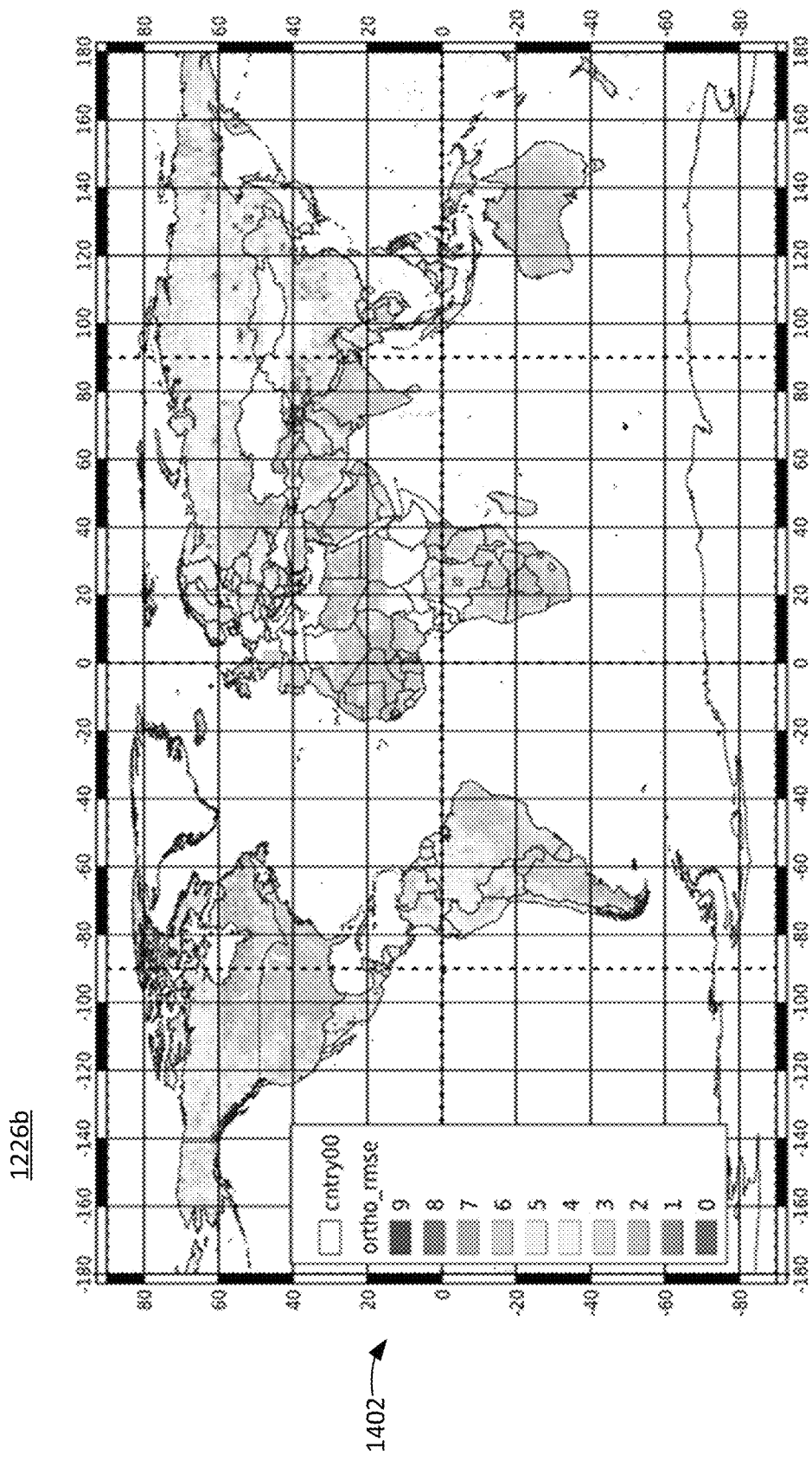

FIG. 14 depict another absolute geospatial accuracy heatmap 1226b, which may be generated by the absolute geospatial accuracy engine 124. The heatmap 1226b also visually depicts estimates of absolute geospatial accuracy for different parts of the world, and may be generated based on processing of many different sets of images. The heatmap 1226b is for orthorectified images. The legend 1402 indicates that colors may be used to represent the value of the absolute geospatial accuracy. The legend 1402 uses the same color scheme as the example of FIG. 13. In this example, the absolute geospatial accuracy is calculated as an RMSE. In FIG. 14, many of the points (pixels) on the map have an RMSE between 2-5, as indicated by most of the pixels being green, yellow-green, or yellow. Some pixels, such as those the correspond to mountainous regions have an even higher RMSE (e.g., 6-9), as indicated by pixels that are orange or red. For example, the Himalayas have many red pixels, which indicates a high value for the RMSE. As will be discussed in connection with the process of FIG. 16, differences between the heatmaps in FIGS. 13 and 14 may be an indication of problem areas in a DEM.

Figure 15:
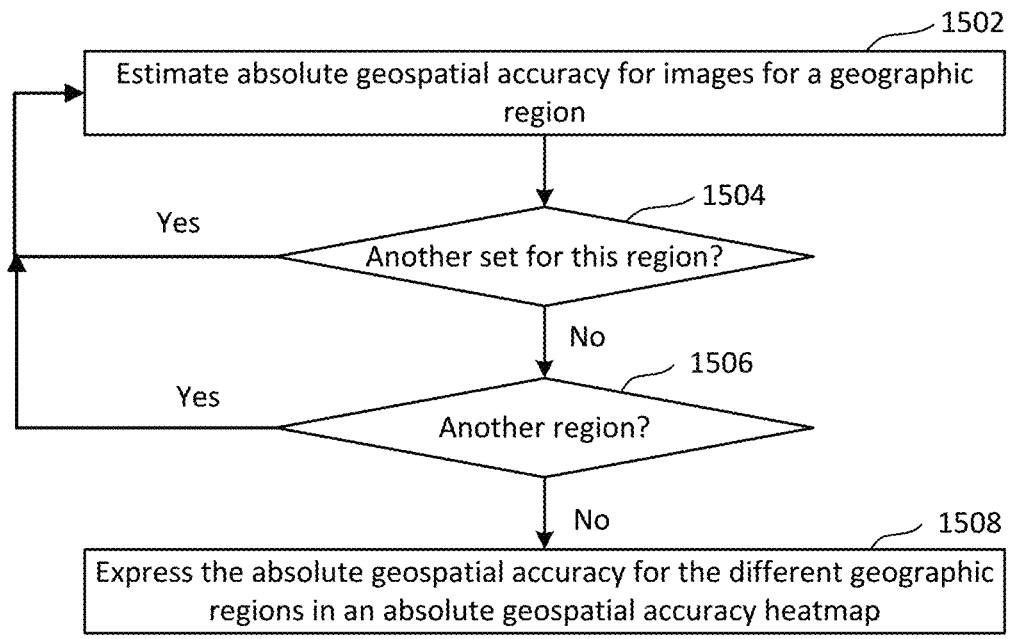
FIG. 15 is a flowchart of one embodiment of a process of generating an absolute geospatial accuracy heatmap.

FIG. 15 is a flowchart of one embodiment of a process of generating an absolute geospatial accuracy heatmap. The process may be performed by the absolute geospatial accuracy engine 124. In step 1502, the system estimates the absolute geospatial accuracy for images for a geographic region. In one embodiment, these are Level 1B images. In one embodiment, these are orthorectified images. In an embodiment, the system performs the process of FIG. 2 on the images. In step 1504, the system determines whether there is another set of images to process for this geographic region. If so, in step 1502, the system estimates the absolute geospatial accuracy for this set of images for the geographic region. Note that a substantial amount of time may pass between iterations of step 1502. For example, step 1502 may be for images that were collected over months, or even years. In some embodiments, the system compares the estimates of absolute geospatial accuracy for the region that are generated each time step 1502 is performed. In one embodiment, the system continues to repeat step 1502 for different sets of images until the system determines that a statistical significance has been achieved. In an embodiment, the sets of images should be the same type of images for each iteration (e.g., all Level 1B or all orthorectified).

In step 1506, the system determines whether there is a set of images for a different region to process. In an embodiment, the set of images should be the same type of that were processed in step 1502 for the previous region (e.g., all Level 1B or all orthorectified). After processing numerous sets of images, in step 1508 the system expresses the absolute geospatial accuracy for the different geographic regions in an absolute geospatial accuracy heatmap 1226. For example, heatmap 1226a or heatmap 1226b may be generated and output. In an embodiment, the system determines a value for each pixel in the heatmap, based on an absolute geospatial accuracy (e.g., RMSE) for the region that corresponds to the pixel. In one embodiment, a color scale is used to represent the value of an RMSE.

Another use of the estimate of the absolute geospatial accuracy is to evaluate accuracy of a digital elevation map (DEM). This evaluation may be based on a comparison the estimated absolute geospatial accuracies of two sets of images of a geographic region. The two sets of images may be, for example, Level 1B images and orthorectified images. Errors in the DEM may be determined based on differences between the estimated absolute geospatial accuracy of the set of orthorectified images and the estimated absolute geospatial accuracy of the set of Level 1B images.

Figure 16:
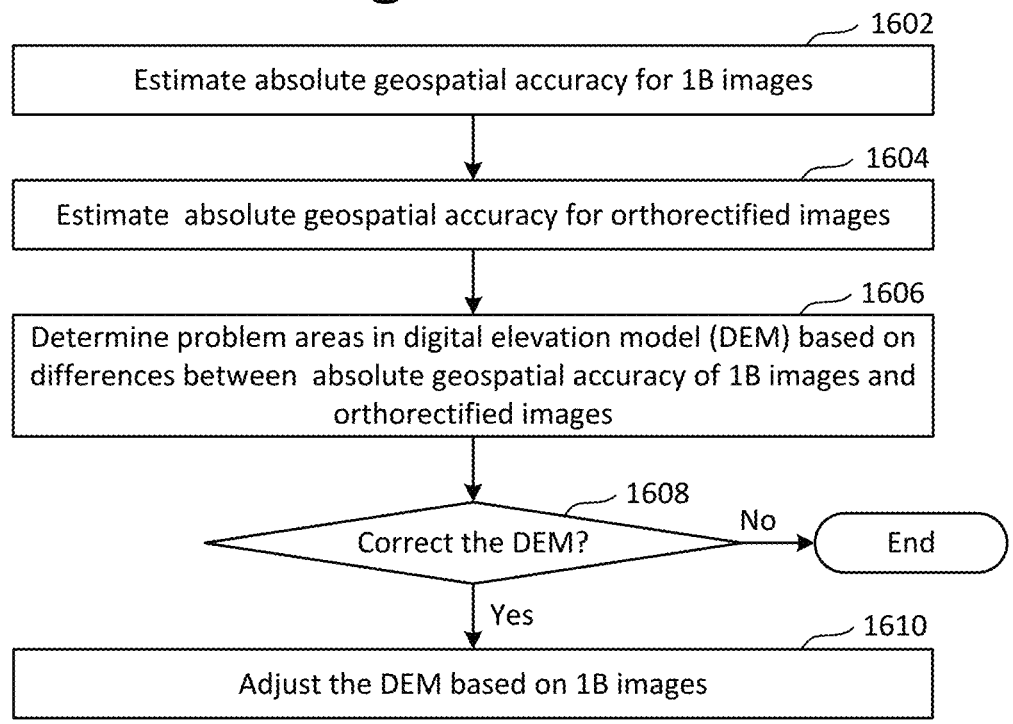
FIG. 16 is a flowchart of one embodiment of a process of evaluating accuracy in a digital elevation model based on estimate of the absolute geospatial accuracies of two different sets of images.

FIG. 16 is a flowchart of one embodiment of a process of evaluating accuracy in a DEM based on estimates of the absolute geospatial accuracies of two different sets of images. The process may be performed by image processing engine 120 and/or absolute geospatial accuracy engine 124. In step 1602 the system estimates the absolute geospatial accuracy for a set of Level 1B images for a geographic region. This could be for one bundle job. For example, this could be for a set of Level 1B images that are to be orthorectified using the bundle adjustment process described herein. In one embodiment, the process of FIG. 2 is used to estimate the absolute geospatial accuracy for the set of Level 1B images. The estimate may be for the entire set of images. For example, any of Equations 1, 2 and/or 3 may be used to generate an estimate for the entire set of images.

In step 1604 the system estimates the absolute geospatial accuracy for a set of orthorectified images for the geographic region. This could be for the bundle job referred to in step 1602. For example, this could be the orthorectified images that were generated based on processing the Level 1B images. In one embodiment, the process of FIG. 2 is used to estimate the absolute geospatial accuracy for the set of orthorectified images. The estimate may be for the entire set of orthorectified images. For example, any of Equations 1, 2 and/or 3 may be used to generate an estimate for the entire set of orthorectified images.

In step 1606, the system determines problem areas in a DEM based on differences between the absolute geospatial accuracy for the Level 1B images and the absolute geospatial accuracy for the orthorectified images. With reference back to FIG. 7, it might be that bundle adjustment has been successful at getting the rays 602, 604, 606 to intersect very close to intersection point 614, which may result in a very accurate absolute geospatial accuracy for the set of Level 1B images. However, in some regions there may be substantial DEM errors. A substantial DEM error may result in a low absolute geospatial accuracy for the orthorectified images (e.g., high RMSE). Therefore, a large difference between the absolute geospatial accuracy for the orthorectified images and the Level 1B images may be a result of significant DEM error.

In step 1608, the system determines whether to correct the DEM. If the DEM is to be corrected, then the system corrects the DEM in step 1610. With reference to FIG. 7, it may be that there are systemic errors in the DEM, such that the intersection points are actually far more accurate than the DEM. In one embodiment, the DEM is raised or lowered to match ray intersection points of the Level 1B images. For example, the DEM in FIG. 7 may be raised to intersection point 614.

Figure 17:
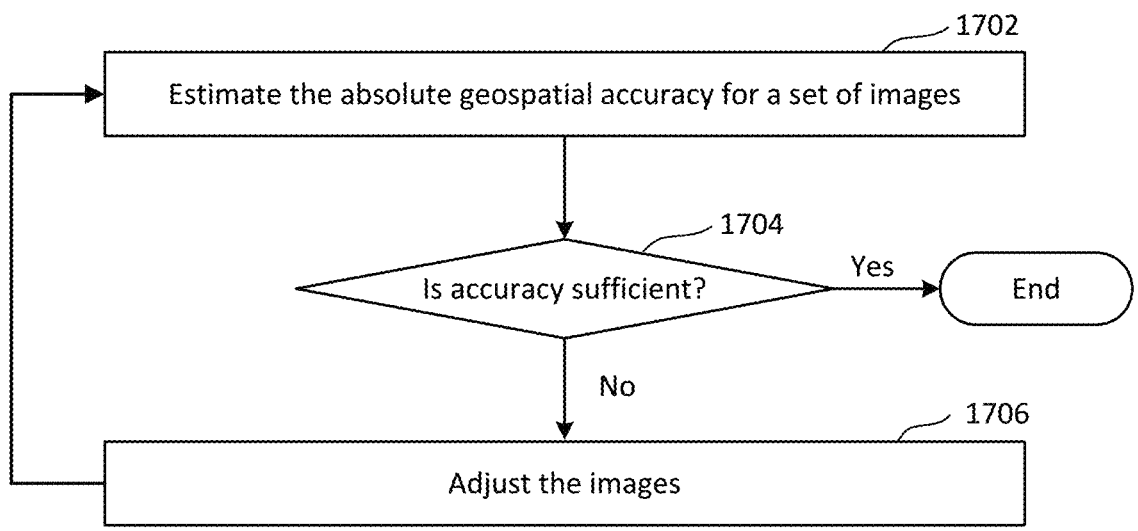
FIG. 17 is a flowchart of one embodiment of a process of adjusting images to meet a target absolute geospatial accuracy.

Another use of the estimated absolute geospatial accuracy for a set of images is to determine whether the images should be adjusted to meet some target absolute geospatial accuracy. FIG. 17 is a flowchart of one embodiment of a process of adjusting images to meet a target absolute geospatial accuracy. The process may be performed by image processing engine 120 and/or absolute geospatial accuracy engine 124. In step 1702 the system estimates the absolute geospatial accuracy for a set of images. In an embodiment, the process of FIG. 2 is performed. In step 1704, the system determines whether the absolute geospatial accuracy is sufficient. In an embodiment, the system compares the estimated absolute geospatial accuracy to a threshold. The threshold is a target absolute geospatial accuracy. If the estimated absolute geospatial accuracy is above the threshold, then the system adjusts the images in step 1706. Note that the estimated absolute geospatial accuracy may be defined in terms of an error (e.g., RMSE), hence a low error value for the absolute geospatial accuracy is desirable. Adjusting the images could include adjusting metadata such as attitude or ephemeris data. Adjusting the images could include removing some of the images from the set. Adjusting the images could include bundle adjustment. After adjusting the images, the system again estimates the absolute geospatial accuracy in step 1702. Then, in step 1704, the system again compares the estimated absolute geospatial accuracy to the threshold. If the estimated absolute geospatial accuracy indicates that the target absolute geospatial accuracy has been met, the process ends. If the estimated absolute geospatial accuracy is still above the threshold, the system may again adjust the images in step 1706. There may be an option to exit the process without the target absolute geospatial accuracy being met if, for example, further adjustments to the images would be unlikely to meet the target.

As discussed herein, the system may estimate absolute geospatial accuracy for a set of images based on a statistical measure of the relative accuracies between the pairs of the overlapping images. In an embodiment, the system estimates absolute geospatial accuracy for a set of images based on a root mean square error of the shear for each pair of overlapping images in the set. The following provides further details on the statistical relationship between shear measured in overlapping images and absolute geospatial accuracy. In some embodiments, the relative shear in a set of images (e.g., a mosaic of images) are automatically determined. While this is valuable information by itself, the following discussion will show that the shear can also be used to predict a weighted RMSE of the absolute error of the image mosaic (e.g., absolute geospatial accuracy) even without ground control points.

The following derives the expected value of the absolute weighted RMSE of a mosaic from the measured relative shear in the pairwise overlaps in a mosaic. If there is no systemic bias in the absolute error (i.e. error is assumed to be randomly distributed), the estimation result would be a close approximation to the absolute error. However, even if there is some systemic bias in the absolute error the results are still useful, although the results may underestimate the actual error. As noted, an input may be the shear offsets between overlapping images in the x and y dimensions. Consider first the x dimension.

For a given overlapping image pair with measured shear, let $a_x$ and $b_x$ be the positional error offsets of the two images on the number line from ground truth (centered at 0). FIG.

18 depicts two number lines 1802, 1804 with ground truth (centered at 0), as well as the positional error offsets $a_x$ and $b_x$ of the two images. Each number line 1802, 1804 covers one case. Observe that the absolute pointing error of the two images is thus $|a_x|$ and $|b_x|$. Without loss of generality, assume that $|a_x| \leq |b_x|$. Let $d_x$ be the measured shear between the two images, and thus $d_x=|b_x-a_x|$. It is well to note that we do not know which error term corresponds to which image, but as we will see below, this is inconsequential to obtaining our result.

We now derive several relationships between $d_x$, $a_x$, and $b_x$. Let $E[d_x^2]$ be the expected value of the square of $d_x$.

Lemma 1.1: $E[d_x^2]=a_x^2+b_x^2$

Observe that there are four possible cases of the locations on the number line of $a_x$ and $b_x$ with respect to ground truth: 1) both $a_x$ and $b_x$ values are positive; 2) both $a_x$ and $b_x$ values are negative; 3) $a_x$ is positive and $b_x$ is negative; 4) $a_x$ is negative and $b_x$ is positive.

Figure 18:
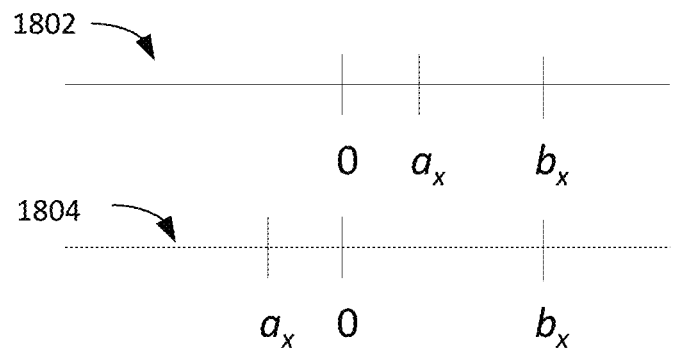
FIG. 18 depicts two number lines with ground truth (centered at 0), as well as the positional error offsets $a_x$ and $b_x$ of two images.

It suffices to consider only two of the four cases: $b_x$ is positive and $a_x$ negative, and both values are positive (see FIG. 18). The other two cases are symmetrical to these two with respect to relative distance.

Since it may be assumed that the error in the images is unbiased, we can therefore assume that either case will happen with equal probability. In other words, $Pr(d_x=|b_x|+|a_x|)=0.5$ and $Pr(d_x=|b_x|-|a_x|)=0.5$. If we square the values of each case, observe that expected value of the square of the shear is as follows.

$$E[d_x^2] = .5(|b_x|+|a_x|)^2 + .5(|b_x|-|a_x|)^2 = .5(b^2+a^2+2ab) + .5(b^2+a^2-2ab) = a^2+b^2$$

The same reasoning may be applied toy dimension to arrive at Lemma 1.2:

Lemma 1.2 $E[d_y^2]=a_y^2+b_y^2$

We now consider estimating a weighted RMSE absolute error for the mosaic. The general form for RMSE for values $t_1, t_2, \ldots, t_n$ is:

$$RMSE = \sqrt{\frac{\sum_{i=1}^{n} t_i^2}{n}}$$

Consider again the x dimension and let:

$$X = \sqrt{\frac{\sum_{i=1}^{k} d_{xi}^2}{2k}}$$

The above equation is for all k shear values. Note that the 2 in the divisor is due to each shear value containing two image error values, as shown in Lemma 1.1.

Observe that an image's error term in the mosaic can be represented multiple times in X. More specifically, observe that a given image j with squared absolute error $e_{xj}^2$ has weight $p_j$, where $p_j$ is the number of pairwise shear measurements that j participates in. Let n be the number of images in the mosaic. Thus the follow results by linearity of expectation and from Lemma 1.1.

$$E\left[\sum_{i=1}^{k}(d_{xi}^2)\right] = \sum_{i=1}^{k}(E[d_{xi}^2]) = \sum_{i=1}^{k}(a_{xi}^2+b_{xi}^2) = \sum_{i=1}^{n} p_i e_{xi}^2$$

We now consider approximating E [X]. Let $$\mu_x = \frac{\sum_{i=1}^{k}(a_{xi}^2+b_{xi}^2)}{2k} = \frac{E\left[\sum_{i=1}^{k} d_{xi}^2\right]}{2k} = \frac{\sum_{i=1}^{n} p_i e_{xi}^2}{2k}$$

Theorem 1.1: $E[X] \approx \sqrt{\mu_x} = \sqrt{\frac{E\left[\sum_{i=1}^{k} d_{xi}^2\right]}{2k}}$ Let Z be the expression inside the square root of X, or $$Z = \frac{\sum_{i=1}^{k} d_{xi}^2}{2k}$$

We use the Taylor Series Expansion for $\sqrt{Z}$ centered around $\mu_x$, up to the $1^{st}$ moment. Namely, $f(x) \approx f(x_0)+(x-x_0)f'(x_0)$ where $f(x)=\sqrt{(x)}$ and $x_0=\mu_x$. Thus, by linearity of expectation:

$$E[X] = E[\sqrt{Z}] \approx E\left[\sqrt{\mu_x} + \frac{Z-\mu_x}{2\sqrt{\mu_x}}\right] =$$

$$E[\sqrt{\mu_x}] + E\left[\frac{Z-\mu_x}{2\sqrt{\mu_x}}\right] = E[\sqrt{\mu_x}] + \frac{E[Z-\mu_x]}{2\sqrt{\mu_x}}$$

Observe that the $1^{st}$ moment term $E[Z-\mu_x]=E[Z]-E[\mu_x]=0$, and $\sqrt{\mu_x}$ is a constant value. Thus, our expression simplifies to:

$$E[X] \approx E[\sqrt{\mu_x}] = \sqrt{\mu_x} = \sqrt{\frac{E\left[\sum_{i=1}^{k} d_{xi}^2\right]}{2k}}$$

Recall that the above is represented in Equation 1, which may be used in step 206 of FIG. 2 to estimate the absolute geospatial accuracy for the x-dimension. Similar reasoning applies for the y-dimension.

$$E[Y] \approx \sqrt{\mu_y} = \sqrt{\frac{E\left[\sum_{i=1}^{k} d_{yi}^2\right]}{2k}}$$

With relationships with the shear and absolute errors established for each dimension, we now consider the Euclidean distance of the error terms (i.e. circular error). Let $e_i$ be the circular error for image i. Note that $e_i=\sqrt{e_{xi}^2+e_{yi}^2}$. Let $e_1$ and $e_2$ be the circular errors for two overlapping images with shear measurements $d_{x_{1,2}}$ and $d_{y_{1,2}}$ in the x and y dimensions.

Lemma 1.3: $E[d_{x_{1,2}}^2+d_{y_{1,2}}^2]=e_1^2+e_2^2$

From Lemmas 1.1 and 1.2:

$$e_1^2+e_2^2=a_{x_{1,2}}^2+b_{x_{1,2}}^2+a_{y_{1,2}}^2+b_{y_{1,2}}^2=E[d_{x_{1,2}}^2+d_{y_{1,2}}^2]$$

Observe that it is inconsequential which e term the a and b terms belong to. For example, as the sum the squares of $e_1$ and $e_2$ will be the same in any case.

$$e_1=\sqrt{a_{x_{1,2}}^2+b_{y_{1,2}}^2} \text{ or } e_1=\sqrt{a_{x_{1,2}}^2+a_{y_{1,2}}^2} \text{ or } e_1=\sqrt{b_{x_{1,2}}^2+b_{y_{1,2}}^2}$$

Finally, we let:

$$\mu_e = \frac{\sum_{i=1}^{k}(a_{xi}^2 + a_{yi}^2 + b_{xi}^2 + b_{yi}^2)}{2k} = \frac{E\left[\sum_{i=1}^{k} d_{xi}^2 + d_{yi}^2\right]}{2k} = \frac{\sum_{i=1}^{n} p_i e_i^2}{2k}$$

We employ a similar Taylor Series Expansion estimation from before, and we get our RMSE approximation result for circular error for the mosaic.

$$\text{Theorem 1.3: } E[C] \approx \sqrt{\mu_e} = \sqrt{\frac{E\left[\sum_{i=1}^{k} d_{xi}^2 + d_{yi}^2\right]}{2k}}$$

It should also be noted that since the square root function is both differentiable and concave, it therefore is true that approximating the function using the Taylor Series up to the $1^{st}$ moment bounds it from above. In other words:

$$E[X] \leq \sqrt{\mu_x} = \sqrt{\frac{E\left[\sum_{i=1}^{k} d_{xi}^2\right]}{2k}}, E[Y] \leq \sqrt{\mu_y} = \sqrt{\frac{E\left[\sum_{i=1}^{k} d_{yi}^2\right]}{2k}},$$

and $E[C] \leq \sqrt{\mu_e} = \sqrt{\frac{E\left[\sum_{i=1}^{k} d_{xi}^2 + d_{yi}^2\right]}{2k}}$ As noted above, in some embodiments, the system determines a confidence in the estimate of the absolute geospatial accuracy of a set of image. The following is a discussion showing that the probability of the event of a given shear measurement C for a mosaic deviating far from its expected value→0 as the number of images n→∞. Moreover, the decay rate is appreciable enough to give high confidence in the precision of our result for even moderate-to-small sized mosaics (n≥60).

We again examine:

$$\mu_e = \frac{\sum_{i=1}^{k}(a_{xi}^2 + a_{yi}^2 + b_{xi}^2 + b_{yi}^2)}{2k} = \frac{E\left[\sum_{i=1}^{k} d_{xi}^2 + d_{yi}^2\right]}{2k} = \frac{\sum_{i=1}^{n} p_i e_i^2}{2k}$$

We observe that each e is independent (both in x and y dimensions), thus giving us 2n independent random variables. Therefore, we can use Chernoff Bounds to bound the probability of the event that a given mosaic's result deviates from its expected value. The general form Chernoff Bounds is: for a given sum of independent random variables S with expected value $\mu$, then $\forall \delta > 0$, $$Pr(S \geq (1+\delta)\mu) < \left(\frac{e^\delta}{(1+\delta)^{(1+\delta)}}\right)^\mu$$

$$Pr(S \leq (1-\delta)\mu) < \left(\frac{e^{-\delta}}{(1-\delta)^{(1-\delta)}}\right)^\mu$$

In one example case, $\mu=2\mu_e$, and $S=\Sigma_{i=1}^{n} p_i e_i^2$. We are therefore interested in bounding $$\frac{S}{2k}.$$

Empirically, it has been observed that k≥4n for reasonably-sized, well-formed mosaics. This is due to the images being embedded in a geospatial domain, and generally are well-connected with each other to form continuous coverage across its area of interest (AOI). Thus, our bounded term of interest becomes $$\frac{S}{8n}.$$

observe mat we can divide nom sides of the inequality inside the probability expression in the Chernoff Bounds by 8n to get:

$$Pr\left(\frac{S}{8n} \geq (1+\delta)\frac{2n}{8n}\mu_e\right) < \left(\frac{e^\delta}{(1+\delta)^{(1+\delta)}}\right)^{2n\mu_e}$$

$$Pr\left(\frac{S}{8n} \leq (1-\delta)\frac{2n}{8n}\mu_e\right) < \left(\frac{e^{-\delta}}{(1-\delta)^{(1-\delta)}}\right)^{2n\mu_e}$$

In an embodiment, the two above inequalities are used to determine the confidence in the estimate of the absolute geospatial accuracy of the set of images. In the two above inequalities, n is the number of shear samples (or image overlaps). It should be noted the general form of Chernoff Bounds can be unwieldy to use in practice, and there are looser forms of Chernoff Bounds that are more convenient for plotting decay trends. However, to illustrate the best possible tightness of the result, if we let $$\delta = 10\frac{\ln n}{2n\mu_e},$$

for $\mu_e=1$, wan n=60, then the probability of deviation by more than 8.5% from the expected value (either above or below) is less than 0.3%. To give another example, if we let $$\delta = 5.8\frac{\ln n}{2n\mu_e},$$

then the values change to deviating by more than 5% from the expected value is less than 20%. As $\mu_e$ grows larger and/or n grows larger, the probability of deviation gets even smaller.

Finally, we again consider the enclosing square root function for calculating RMSE, as $$\sqrt{\frac{S}{2k}} = C,$$

from Theorem 1.3. We now show that applying the square root of RMSE will only increase, or will be inconsequential to, the tightness of our bound. Namely, we compare the situations of computing the deviation of expected value, both with and without the square root.

Lemma2.1: If $\mu_e \geq 0.3$ and $0 < \delta \leq 0.3$, then $\sqrt{\mu_e} - \sqrt{\mu_e - \delta\mu_e} < \mu_e - (\mu_e - \delta\mu_e)$ We simplify the expression and solve for $\mu_e$ in terms of $\delta$. This gives us:

$$\sqrt{\mu_e} - \sqrt{\mu_e - \delta\mu_e} < \mu_e - (\mu_e - \delta\mu_e)$$

$$\left(\sqrt{\mu_e} - \sqrt{\mu_e - \delta\mu_e}\right)^2 < (\mu_e - (\mu_e - \delta\mu_e))^2$$

$$\mu_e - 2\sqrt{\mu_e}\sqrt{\mu_e - \delta\mu_e} + (\mu_e - \delta\mu_e) < (\delta\mu_e)^2$$

$$\mu_e - 2\sqrt{\mu_e}\sqrt{\mu_e}\sqrt{1-\delta} + (\mu_e - \delta\mu_e) < \delta^2\mu_e^2$$

$$\frac{2\mu_e - 2\mu_e\sqrt{1-\delta} - \delta\mu_e}{\delta^2\mu_e} < \mu_e$$

$$\frac{2 - 2\sqrt{1-\delta} - \delta}{\delta^2} < \mu_e$$

Figure 19:
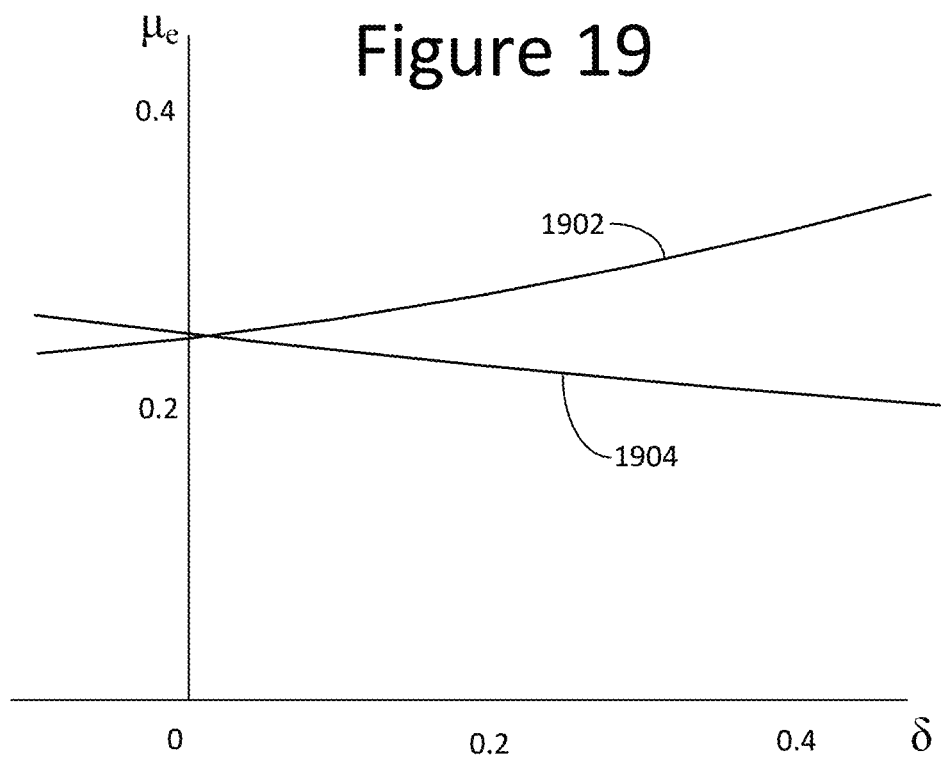
FIG. 19 is a graph pertaining to deviations from expected values for absolute geospatial accuracy.

The following function is plotted in FIG. 19.

$$\frac{2 - 2\sqrt{1-\delta} - \delta}{\delta^2}$$

In FIG. 19, the x axis is $\delta$ and the y axis is $\mu_e$. Lemma 2.1 is represented by line 1902. Lemma 2.2 is represented by line 1904. Observe that for all $0 < \delta \leq 0.3$, the inequality holds true if $\mu_e \geq 0.3$ (namely, the area above line 1904). Observe that both inequalities are satisfied if $y \geq 0.3$ (the area above both lines) for the range $0 < x \leq 0.3$.

Lemmas 2.1 and 2.2 show that the square root function for calculating RMSE will only improve our tightness result as long as $\mu_e \geq 0.3$ and $\delta \leq 30\%$.

To summarize, we have shown that an embodiment of an estimation of the absolute geospatial accuracy will not deviate by a large amount from its expected value with high probability for even moderately-small mosaics (n≥60). Even lower values of n could also provide an estimation of the absolute geospatial accuracy that will not deviate by a large amount from its expected value with high probability.

Note that processes described herein are fully automated and do not require any manual measurements by people. For example, the processes of FIGS. 2, 3, 6, 8, 10, 15, 16, and 17 are fully automated. Numerous examples have been provided in which the processes could applied to satellite imagery; however, the processes could also be applied to aerial imagery from other manned or unmanned air-based or land-based vehicles or structures. The processes described herein may applied to electro-optical (EO) visual-band imagery but can also be applied to other electromagnetic bands such as SWIR, IR, SAR, multispectral, or hyperspectral.

One embodiment includes a machine-implemented method, comprising accessing a set of input images, the set of input images comprising overlapping images. The method comprises determining relative accuracies between pairs of the overlapping images. The method comprises estimating absolute geospatial accuracy of the set of the input images, without absolute geospatial reference points, based on a statistical measure of the relative accuracies between the pairs of the overlapping images.

In one example implementation estimating the absolute geospatial accuracy of the set of the input images, without absolute geospatial reference points, based on the statistical measure of the relative accuracies between the pairs of the overlapping images further comprises determining a root mean square error of the relative accuracies between the pairs of the overlapping images.

In one example implementation estimating the absolute geospatial accuracy of the set of the input images, without absolute geospatial reference points, based on the statistical measure of the relative accuracies between the pairs of the overlapping images further comprises: determining one or more terms to account for unmodeled or empirically known error; and modifying the root mean square error based on the one or more terms.

In one example implementation determining the relative accuracies between the pairs of the overlapping images comprises calculating a shear for each pair of overlapping images, and estimating the absolute geospatial accuracy of the set of the input images comprises determining a statistic that is based on the shear for each pair of the overlapping images.

In one example implementation determining the statistic that is based on the shear for each pair of overlapping images comprises determining a root mean square error based on the shear for each pair of the overlapping images.

One example implementation further includes filtering a set of ground control points by, for each ground control point: determining an offset between the ground control point and a corresponding point in the set of the input images; comparing the offset with the estimate of the absolute geospatial accuracy of the set of the input images; and identifying the ground control point as having suspect accuracy responsive to the offset failing to meet an accuracy threshold.

One example implementation further includes evaluating a digital elevation map (DEM) of a geographic region by: estimating absolute geospatial accuracy of a set of Level 1B images of the geographic region based on a statistical measure of relative accuracies between pairs of overlapping Level 1B images in the set of Level 1B images; estimating absolute geospatial accuracy of a set of orthorectified images of the geographic region based on a statistical measure of relative accuracies between pairs of overlapping orthorectified images in the set of orthorectified images; and determining errors in the DEM based on differences between the estimated absolute geospatial accuracy of the set of orthorectified images and the estimated absolute geospatial accuracy of the set of Level 1B images.

One example implementation further includes correcting the DEM based on the set of Level 1B images.

One example implementation further includes performing the steps of claim 1 to estimate an absolute geospatial accuracy for each of a plurality of sets of images of different geographic regions.

One example implementation further includes generating an absolute geospatial accuracy heatmap of the different geographic regions based on the absolute geospatial accuracy of each respective geographic region.

One example implementation further includes determining whether the estimate of the absolute geospatial accuracy of the set of input images meets an accuracy threshold; and in response to determining that the estimate of the absolute geospatial accuracy of the set of input images does not meet the accuracy threshold, adjusting the accuracy of the set of input images until the accuracy threshold is met.

One example implementation further includes calculating a confidence in the estimate of the absolute geospatial accuracy of the set of input images based on a number of images in the set of input images.

In one example implementation the set of input images comprise a mosaic.

In one example implementation the set of input images comprise a time series.

One embodiment includes one or more non-transitory processor readable storage mediums that collectively store processor readable code that, when executed by one or more processors, cause the one or more processors to perform a method. The method comprises accessing a set of input images, the set of input images comprising overlapping images; determining relative accuracies between pairs of the overlapping images; and estimating absolute geospatial accuracy of the set of the input images, without absolute geospatial reference points, based on a statistical measure of the relative accuracies between the pairs of the overlapping images. Examples of non-transitory processor readable storage mediums include RAM (e.g., DRAM, SRAM), ROM, flash memory, MRAM, other solid state memories, disk drives, etc.).

One embodiment includes an apparatus comprising one or more processors and one or more processor readable storage devices in communication with the one or more processors. The one or more processor readable storage devices store code for programming the one or more processors to: access a set of input images, the set of input images comprising overlapping images; determine relative accuracies between pairs of the overlapping images; and estimate absolute geospatial accuracy of the set of the input images, without absolute geospatial reference points, based on a statistical measure of the relative accuracies between the pairs of the overlapping images.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A machine-implemented method, comprising:
   accessing a set of input images, the set of input images comprising overlapping images;
   determining relative accuracies between pairs of the overlapping images, including calculating a shear for each pair of overlapping images;
   estimating absolute geospatial accuracy of the set of the input images, without absolute geospatial reference points, based on a statistical measure of the relative accuracies between the pairs of the overlapping images, including determining a statistic that is based on the shear for each pair of the overlapping images; and
   filtering a set of ground control points by, for each ground control point:
      determining an offset between the ground control point and a corresponding point in the set of the input images;
      comparing the offset with the estimate of the absolute geospatial accuracy of the set of the input images; and
      identifying the ground control point as having suspect accuracy responsive to the offset failing to meet an accuracy threshold.

2. The machine-implemented method of claim 1, wherein estimating the absolute geospatial accuracy of the set of the input images, without absolute geospatial reference points, based on the statistical measure of the relative accuracies between the pairs of the overlapping images comprises:
   determining a root mean square error of the relative accuracies between the pairs of the overlapping images.

3. The machine-implemented method of claim 2, wherein estimating the absolute geospatial accuracy of the set of the input images, without absolute geospatial reference points, based on the statistical measure of the relative accuracies between the pairs of the overlapping images further comprises:
   determining one or more terms to account for unmodeled or empirically known error; and
   modifying the root mean square error based on the one or more terms.

4. The machine-implemented method of claim 1, wherein determining the statistic that is based on the shear for each pair of overlapping images comprises:
   determining a root mean square error based on the shear for each pair of the overlapping images.

5. The machine-implemented method of claim 1, further comprising:
   evaluating a digital elevation map (DEM) of a geographic region by:

estimating absolute geospatial accuracy of a set of Level 1B images of the geographic region based on a statistic that is based on a shear between pairs of overlapping Level 1B images in the set of Level 1B images;

estimating absolute geospatial accuracy of a set of orthorectified images of the geographic region based on a statistic that is based on a shear between pairs of overlapping orthorectified images in the set of orthorectified images; and determining errors in the DEM based on differences between the estimated absolute geospatial accuracy of the set of orthorectified images and the estimated absolute geospatial accuracy of the set of Level 1B images.

6. The machine-implemented method of claim 5, further comprising:

correcting the DEM based on the set of Level 1B images.

7. The machine-implemented method of claim 1, further comprising:

estimating an absolute geospatial accuracy for each of a plurality of sets of input images of different geographic regions, including:
 determining relative accuracies between pairs of overlapping images in each set of the plurality of sets of input images of different geographic regions, including calculating a shear for each pair of overlapping images in each set; and
 estimating absolute geospatial accuracy of each set of the input images based on the shear for each pair of the overlapping images.

8. The machine-implemented method of claim 7, further comprising:

generating an absolute geospatial accuracy heatmap of the different geographic regions based on the absolute geospatial accuracy of each respective geographic region.

9. The machine-implemented method of claim 1, further comprising:

determining whether the estimate of the absolute geospatial accuracy of the set of input images meets an accuracy threshold; and in response to determining that the estimate of the absolute geospatial accuracy of the set of input images does not meet the accuracy threshold, adjusting the accuracy of the set of input images until the accuracy threshold is met.

10. The machine-implemented method of claim 1, further comprising:

calculating a confidence in the estimate of the absolute geospatial accuracy of the set of input images based on a number of images in the set of input images.

11. The machine-implemented method of claim 1, wherein the set of input images comprise a mosaic.

12. The machine-implemented method of claim 1, wherein the set of input images comprise a time series.

13. One or more non-transitory processor readable storage mediums that collectively store processor readable code that, when executed by one or more processors, cause the one or more processors to perform a method comprising:

accessing a set of Level 1B images of a geographic region, the set of Level 1B images comprising overlapping Level 1B images;

determining relative accuracies between pairs of the overlapping Level 1B images, including calculating a shear for each pair of overlapping Level 1B images;

estimating absolute geospatial accuracy of the set of the Level 1B images, without absolute geospatial reference points, based on a statistical measure of the relative accuracies between the pairs of the overlapping Level 1B images, including determining a statistic that is based on the shear for each pair of the overlapping Level 1B images;

accessing a set of orthorectified images of the geographic region, the set of orthorectified images comprising overlapping orthorectified images;

determining relative accuracies between pairs of the overlapping orthorectified images, including calculating a shear for each pair of overlapping orthorectified images;

estimating absolute geospatial accuracy of the set of the orthorectified images, without absolute geospatial reference points, based on a statistical measure of the relative accuracies between the pairs of the overlapping orthorectified images, including determining a statistic that is based on the shear for each pair of the overlapping orthorectified images; and evaluating a digital elevation map (DEM) of the geographic region by determining errors in the DEM based on differences between the estimated absolute geospatial accuracy of the set of orthorectified images and the estimated absolute geospatial accuracy of the set of Level 1B images.

14. The one or more non-transitory processor readable storage mediums of claim 13, wherein estimating the absolute geospatial accuracy of the set of the Level 1B images, without absolute geospatial reference points, based on the statistical measure of the relative accuracies between the pairs of the overlapping Level 1B images comprises:

determining a root mean square error of the relative accuracies between the pairs of the overlapping Level 1B images.

15. The one or more non-transitory processor readable storage mediums of claim 13, wherein:

determining the statistic that is based on the shear for each pair of the overlapping Level 1B images comprises determining a root mean square error of the shear for each pair of the overlapping Level 1B images; and determining the statistic that is based on the shear for each pair of the overlapping orthorectified images comprises determining a root mean square error of the shear for each pair of the overlapping orthorectified images.

16. The one or more non-transitory processor readable storage mediums of claim 13, wherein the method further comprises:

filtering a set of ground control points by, for each ground control point:
 determining an offset between the ground control point and a corresponding point in the set of the Level 1B images;
 comparing the offset with the estimate of the absolute geospatial accuracy of the set of the Level 1B images; and
 identifying the ground control point as having suspect accuracy responsive to the offset failing to meet an accuracy threshold.

17. The one or more non-transitory processor readable storage mediums of claim 13, wherein the method further comprises:

estimating an absolute geospatial accuracy for each of a plurality of sets of Level 1B images of different geographic regions, wherein the absolute geospatial accuracy for each set is based on a shear for each pair of overlapping Level 1B images in the set; and generating an absolute geospatial accuracy heatmap of the different geographic regions based on the absolute geospatial accuracy of each respective geographic region.

18. An apparatus, comprising:

one or more processors; and one or more processor readable storage devices in communication with the one or more processors, the one or more processor readable storage devices store code for programming the one or more processors to:

access a set of input images, the set of input images comprising overlapping images;

determine relative accuracies between pairs of the overlapping images, including calculating a shear for each pair of overlapping images;

estimate absolute geospatial accuracy of the set of the input images, without absolute geospatial reference points, based on a statistical measure of the relative accuracies between the pairs of the overlapping images, including determine a statistic that is based on the shear for each pair of the overlapping images; and filter a set of ground control points by, for each ground control point:

determine an offset between the ground control point and a corresponding point in the set of the input images;

compare the offset with the estimate of the absolute geospatial accuracy of the set of the input images; and identify the ground control point as having suspect accuracy responsive to the offset failing to meet an accuracy threshold.

19. A machine-implemented method, comprising:

accessing a set of input images, the set of input images comprising overlapping images;

determining relative accuracies between pairs of the overlapping images, including calculating a shear for each pair of overlapping images;

estimating absolute geospatial accuracy of the set of the input images, without absolute geospatial reference points, based on a statistical measure of the relative accuracies between the pairs of the overlapping images, including determining a statistic that is based on the shear for each pair of the overlapping images; and evaluating accuracy of a set of ground control points based on the estimate of the absolute geospatial accuracy of the set of the input images.

20. The machine-implemented method of claim 19, wherein evaluating the accuracy of the set of ground control points based on the estimate of the absolute geospatial accuracy of the set of the input images further comprises:

identifying ground control points in the set of ground control points as having suspect accuracy based on the estimate of the absolute geospatial accuracy of the set of the input images.

\* \* \* \* \*